United States Patent
Rostami

(10) Patent No.: US 10,115,287 B2
(45) Date of Patent: Oct. 30, 2018

(54) MONITORING SYSTEM, APPARATUS AND METHOD

(71) Applicant: Advanced Wireless Innovations LLC, Santa Monica, CA (US)

(72) Inventor: Ramin Rostami, Calabasas, CA (US)

(73) Assignee: Advanced Wireless Innovations LLC, Santa Monica, CA (US)

( * ) Notice: Subject to any disclaimer, the term of this patent is extended or adjusted under 35 U.S.C. 154(b) by 0 days.

(21) Appl. No.: 14/903,560

(22) PCT Filed: Jul. 10, 2014

(86) PCT No.: PCT/US2014/046253
§ 371 (c)(1),
(2) Date: Jan. 7, 2016

(87) PCT Pub. No.: WO2015/006628
PCT Pub. Date: Jan. 15, 2015

(65) Prior Publication Data
US 2016/0155317 A1    Jun. 2, 2016

Related U.S. Application Data

(60) Provisional application No. 61/943,306, filed on Feb. 22, 2014, provisional application No. 61/939,278, (Continued)

(51) Int. Cl.
G08B 1/08 (2006.01)
G08B 21/18 (2006.01)
H04B 17/14 (2015.01)

(52) U.S. Cl.
CPC ............ *G08B 21/18* (2013.01); *H04B 17/14* (2015.01)

(58) Field of Classification Search
None
See application file for complete search history.

(56) References Cited

U.S. PATENT DOCUMENTS 7,015,943 B2    3/2006  Chiang
7,019,637 B1 *  3/2006  Johnson ................. G08B 21/12
                                                340/506

(Continued)

FOREIGN PATENT DOCUMENTS

CA        2532502 A1    7/2006
CA        2557747 A1    2/2008

(Continued)

OTHER PUBLICATIONS

"Best Home Automation Gadgets Reviews 2016." Doorbell Home, http://www.archive.org/web/20160101001205/http://doorbellhome.org/. Wayback Machine. Jan. 1, 2016. Accessed Feb. 21, 2017. 23 pages.

(Continued)

*Primary Examiner* — Adolf Dsouza
(74) *Attorney, Agent, or Firm* — Mintz Levin Cohn Ferris Glovsky and Popeo, P.C.

(57) ABSTRACT

A system, topology, and methods for monitoring of an environment via one or more sensors and controlling the operation of a controllable module configured to modify the environment. A base system may be coupled to various sensor modules to form different monitoring and control systems. The base system may be connected to the controllable module and a server allowing control of the controllable module.

20 Claims, 17 Drawing Sheets

Related U.S. Application Data filed on Feb. 13, 2014, provisional application No. 61/844,670, filed on Jul. 10, 2013.

(56) References Cited

U.S. PATENT DOCUMENTS

| | | | |
|---|---|---|---|
| 7,486,271 | B2 | 2/2009 | Hershkovitz et al. |
| 7,738,917 | B2 | 6/2010 | Ryley et al. |
| 7,746,223 | B2 | 6/2010 | Howarter et al. |
| 8,294,574 | B2 | 10/2012 | Haywood |
| 8,780,201 | B1 | 7/2014 | Scalisi et al. |
| D711,275 | S | 8/2014 | Scalisi |
| 8,872,915 | B1 | 10/2014 | Scalisi et al. |
| 9,606,551 | B2 * | 3/2017 | Sasaki ................ G05D 23/1917 |
| 2004/0085205 | A1 | 5/2004 | Yeh |
| 2006/0139449 | A1 | 6/2006 | Cheng et al. |
| 2007/0103548 | A1 | 5/2007 | Carter |
| 2008/0284589 | A1 | 11/2008 | Parkulo |
| 2010/0076767 | A1 | 3/2010 | Vieri et al. |
| 2010/0081375 | A1 | 4/2010 | Rosenblatt et al. |
| 2010/0214090 | A1 * | 8/2010 | Sartini ................. H04L 12/581 |
| | | | 340/517 |
| 2012/0280783 | A1 | 11/2012 | Gerhardt et al. |
| 2013/0010120 | A1 | 1/2013 | Nnoruka |
| 2013/0057695 | A1 | 3/2013 | Huisking |
| 2015/0022618 | A1 * | 1/2015 | Siminoff ............... H04N 7/186 |
| | | | 348/14.02 |
| 2015/0022620 | A1 | 1/2015 | Siminoff |
| 2015/0179031 | A1 | 6/2015 | Wallace |
| 2015/0188725 | A1 | 7/2015 | Coles |
| 2015/0228419 | A1 | 8/2015 | Fadell et al. |
| 2015/0339912 | A1 | 11/2015 | Farrand et al. |
| 2016/0191864 | A1 | 6/2016 | Siminoff et al. |
| 2016/0331353 | A1 | 11/2016 | Ralston et al. |
| 2016/0379626 | A1 | 12/2016 | Deisher et al. |
| 2017/0134891 | A1 | 5/2017 | Gettings et al. |

FOREIGN PATENT DOCUMENTS

| | | |
|---|---|---|
| CN | 201878278 U | 6/2011 |
| CN | 201893872 U | 7/2011 |
| CN | 202534032 U | 11/2012 |
| CN | 103167200 A | 6/2013 |
| CN | 104092979 A | 10/2014 |
| CN | 203896453 U | 10/2014 |
| CN | 104200547 A | 12/2014 |
| CN | 204331932 U | 5/2015 |
| CN | 204377051 U | 6/2015 |
| CN | 204442541 U | 7/2015 |
| WO | WO-98/58485 A1 | 12/1998 |

OTHER PUBLICATIONS

"Hot Selling! Zilink New Product Smart Ring Tong WiFi Doorbell." Shenzhen Holdjoy Technology. Co., Ltd. 2015. Last update Feb. 15, 2017. Made-in-China, http://holdjoy.en.made-in-china.com/product/QSsEfTvxVWkG/China-Hot-Selling-Zilink-New-Product-Smart-Ring-Tong-WiFi-Doorbell.html. Accessed Feb. 22, 2017. 3 pages.

Bell, Karissa. "This Doorbell Rings Your Smartphone When You're Not Home." Mashable, Jan. 6, 2015, http://mashable.com/2015/01/06/ring-smart-doorbell/#uFo0pfJm4aqm. Accessed Feb. 21, 2017. 6 pages.

Keller, Joseph. "Keep an Eye Out for Visitors With the DoorBird Video Doorbell." Connectedly, Feb. 18, 2015, http://www.connectedly.com/keep-eye-out-visitors-doorbird-video-doorbell. Accessed Feb. 21, 2017. 3 pages.

Miller, Casey. "August Doorbell Cam Review," Doorbell Home, Oct. 28, 2015, http://www.doorbellhome.org/reviews/august-doorbell-cam/. Accessed Feb. 21, 2017. 10 pages.

Miller, Casey. "Ctronics CT-DB01W Review," Doorbell Home, http://www.doorbellhome.org/reviews/ctronics-ct-db01w-review/. Accessed Feb. 21, 2017. 3 pages.

Prindle, Drew. "Chui Is a Smart Doorbell That Can Recognize Faces and Play Custom Greetings for Your Guests." Digital Trends, Apr. 21, 2014, http://www.digitaltrends.com/home/chui-smart-doorbell-built-facial-recognition/. Accessed Feb. 21, 2017. 13 pages.

Willett, Megan. "The DoorBot App Is a Virtual Doorbell." Business Insider India, Feb. 12, 2013, http://www.businessinsider.in/The-DoorBot-App-Is-A-Virtual-Doorbell/articleshow/21358290.cms. Accessed Feb. 21, 2017. 4 pages.

Woollaston, Victoria. "Eye Spy: Doorbell With Camera and Motion Sensors Shows Who's At the Front Door—Even When You're Not At Home." Daily Mail, Aug. 21, 2013, http://www.dailymail.co.uk/sciencetech/article-2398851/iDoorCam-App-Doorbell-camera-motion-sensors-shows-whos-door.html. Accessed Feb. 21, 2017. 23 pages.

* cited by examiner

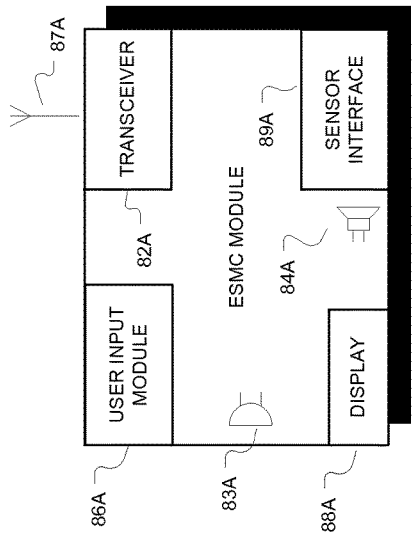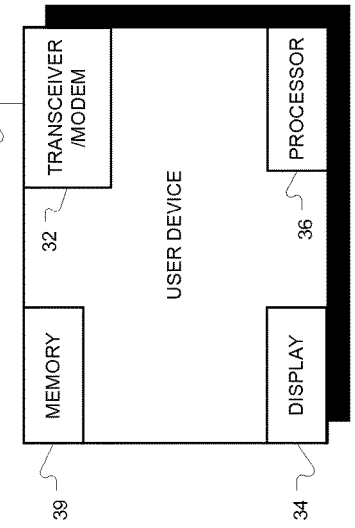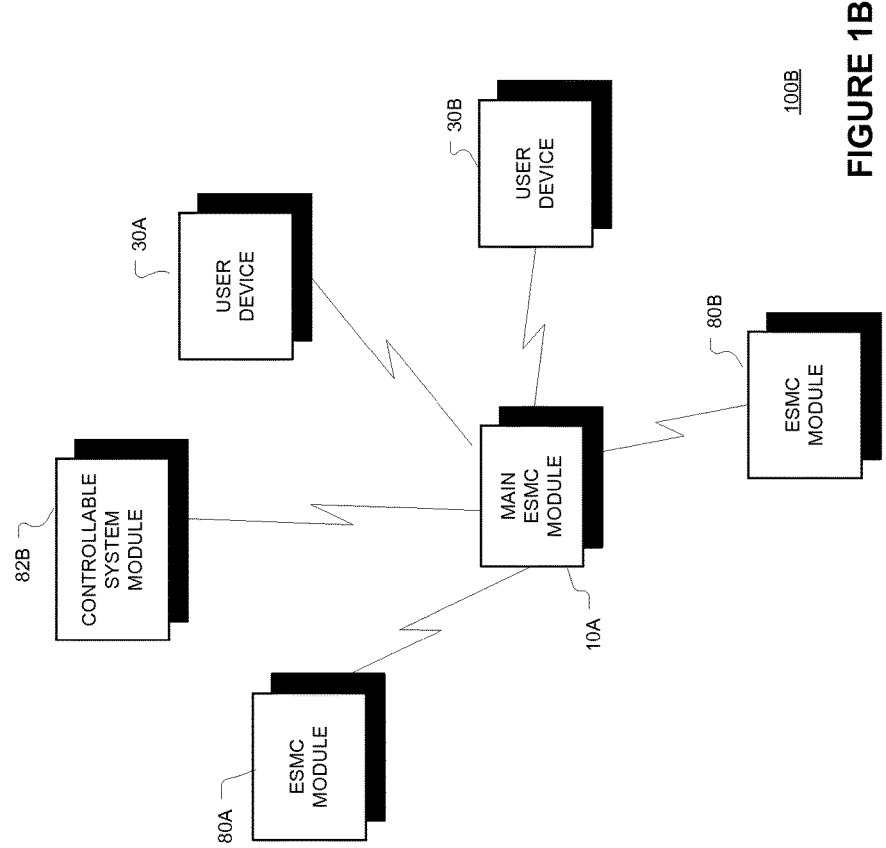

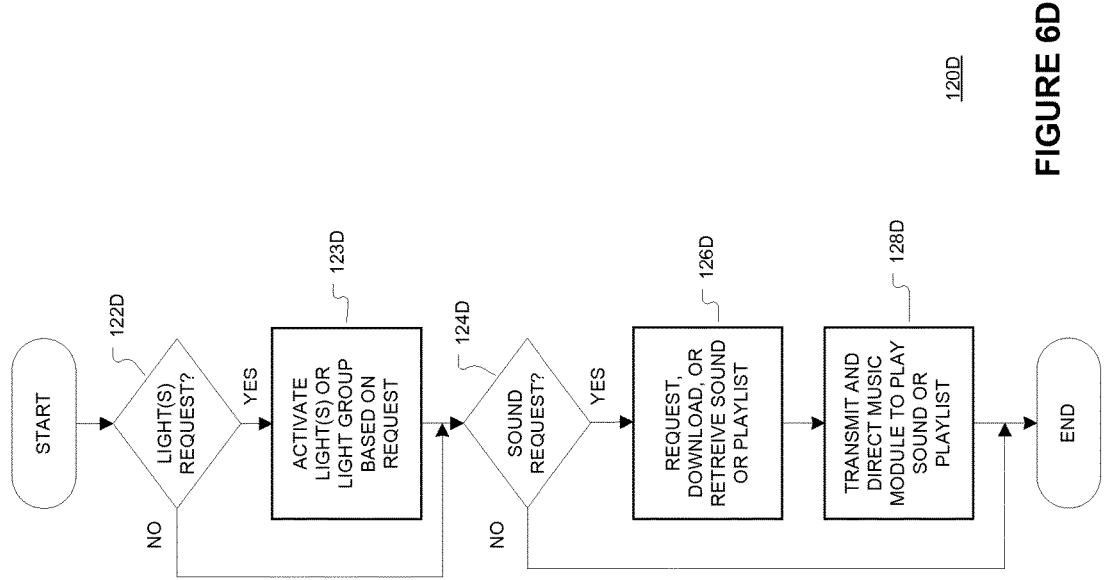
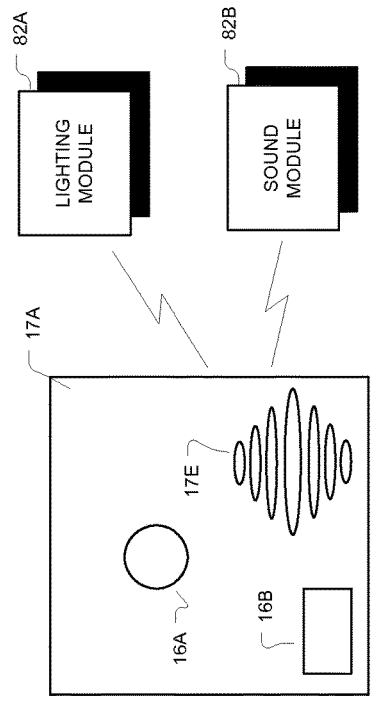
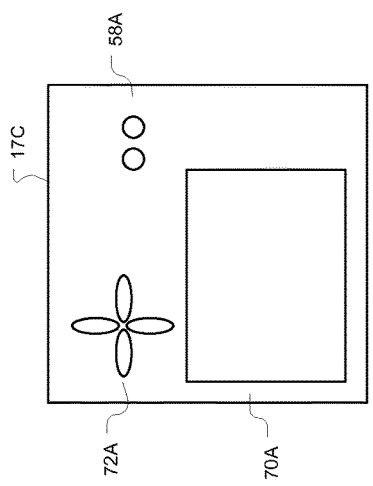

MONITORING SYSTEM, APPARATUS AND METHOD

CROSS REFERENCE TO RELATED APPLICATIONS

The present application is a national-phase entry of Patent Cooperation Treaty Application No. PCT/US2014/046253, entitled "MONITORING SYSTEM, APPARATUS AND METHOD" which has an international filing date of Jul. 10, 2014, and claims the benefit of priority to Application Ser. No. 61/844,670, entitled "WIRELESS DOOR KNOCKER SYSTEM, APPARATUS AND METHOD", and filed on Jul. 10, 2013, Application Ser. No. 61/939,278, entitled "WIRELESS MONITORING SYSTEM, APPARATUS AND METHOD", and filed on Feb. 13, 2014, and Application Ser. No. 61/943,306, entitled "MONITORING AND CONTROL SYSTEM, APPARATUS AND METHOD", and filed on Feb. 22, 2014, all of which are considered as being part of the disclosure of the accompanying application and are hereby incorporated herein by reference.

TECHNICAL FIELD

Various embodiments described herein relate to monitoring environmental and safety conditions including monitoring light, sound, air, and safety conditions and controlling systems that affect or modify light, sound, air, and safety conditions.

BACKGROUND INFORMATION

It may be desirable to monitor environmental and safety conditions including monitoring light, sound, air, and safety conditions and control systems that affect or modify light, sound, air, and safety conditions. The present invention provides devices for same.

BRIEF DESCRIPTION OF THE DRAWINGS

FIG. 1B is a simplified diagram of another environmental and safety monitor and control (ESMC) architecture according to various embodiments.

FIG. 2A is a block diagram of an environmental and safety monitor and control (ESMC) module according to various embodiments.

FIG. 2B is a block diagram of a user device according to various embodiments.

FIGS. 6A-6D are flow diagrams illustrating ESMC methods according to various embodiments.

FIG. 10A is a front view of a simplified diagram of a light and sound monitor and control system according to various embodiments.

FIG. 10B is a back view of a simplified diagram of a light and sound monitor and control module according to various embodiments.

DETAILED DESCRIPTION

Figure 1A:
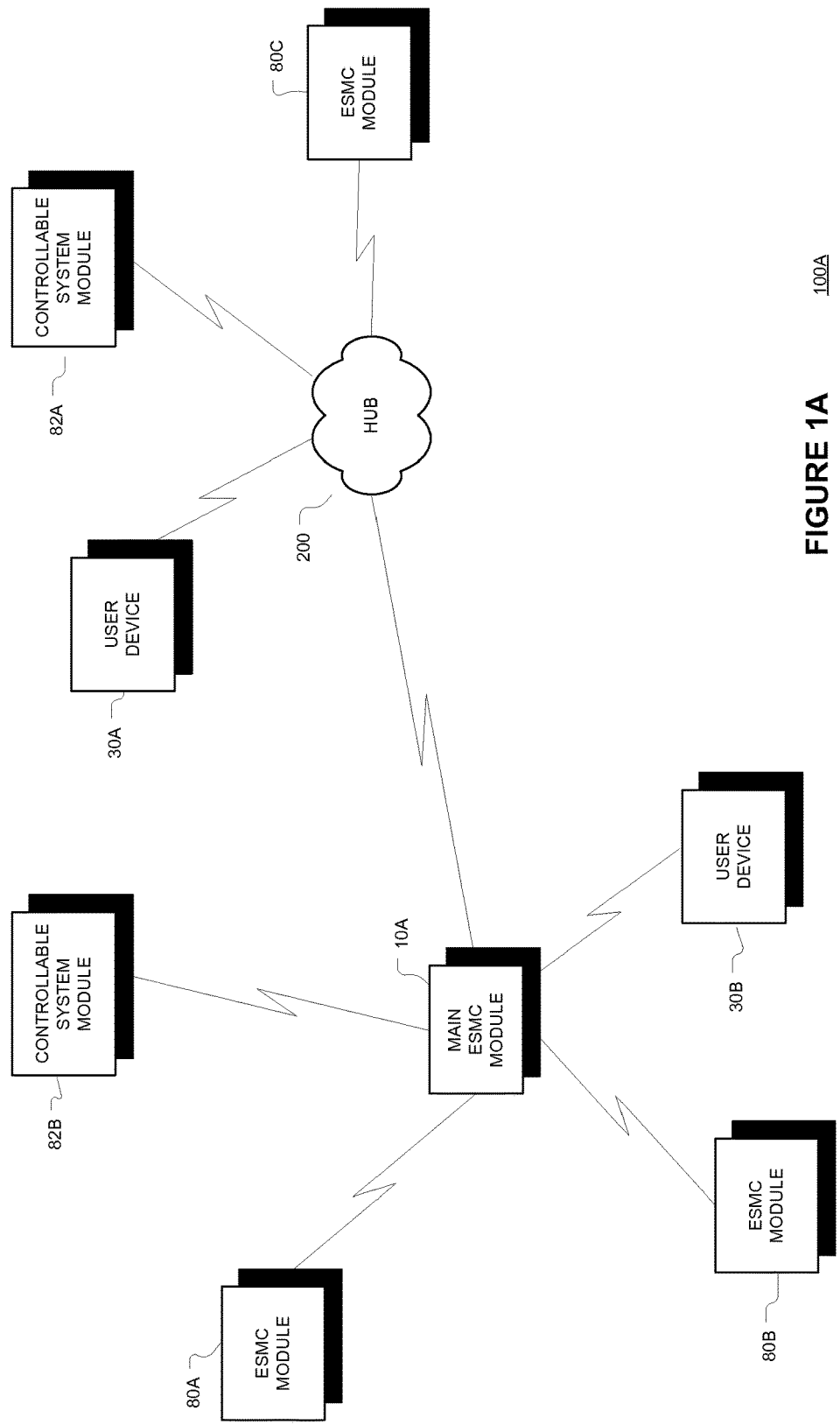
FIG. 1A is a simplified diagram of environmental and safety monitor and control (ESMC) architecture according to various embodiments.

FIG. 1A is a simplified diagram of environmental and safety monitor and control (ESMC) architecture 100A according to various embodiments. As shown in FIG. 1A, architecture 100A may include one or more main ESMC modules 10A, one or more communication hubs, routers, network communication devices, or base stations (HUB) 200, one or more wireless or wired ESMC modules 80A to 80C, one or more wireless or wired controllable system modules 82A, 82B, and one or more wired or wireless user devices 30A-B. The main ESMC module 10A may communicate signals to directly to one or more ESMC modules 80A, 80B via a wired or wireless connection. The main ESMC module 10A may also communicate signals to directly to one or more user devices 30B via a wired or wireless connection. The main ESMC module 10A may also communicate signals to directly to one or more controllable system modules 82B via a wired or wireless connection.

The main ESMC module 10A may communicate signals indirectly to user device 30A via the HUB 200. The main ESMC module 10A may communicate signals indirectly with an ESMC module 80C via the HUB 200. The main ESMC module 10A may communicate signals indirectly with a controllable system module 82A via the HUB 200. The HUB 200 may communicate with the user device 30A, the controllable system module 82A, and the EMSC module 80C via a wired or wireless connection. In an embodiment, the HUB 200 may communicate with the user device 30A, the controllable system module 82A, and the EMSC module 80C via a wireless communication protocol. The HUB 200 may communicate signals with main EMSC module 10A via a wireless communication protocol. In an embodiment, the wireless communication protocol can include an internet protocol (IP). The HUB 200 may communicate with modules 10A, 80C, 82A, and user device 30A via a local network and network of networks including the "Internet".

FIG. 1B is a simplified diagram of another ESMC architecture 100B according to various embodiments. As shown in FIG. 1B, ESMC architecture 100B may include one or more main ESMC modules 10A, one or more wireless or wired ESMC modules 80A to 80C, one or more wireless or wired controllable system modules 82A, 82B, and one or more wired or wireless user devices 30A-B. In ESMC architecture 100B, a main ESMC module 10A may communicate directly via ESMC modules 80A to 80C, controllable system modules 82A, 82B, and user devices 30A-B via a wired or wireless connection. The main ESMC modules 10A may communicate with an ESMC module 80A to 80C, a controllable system module 82A, 82B, and a user device 30A-B via a local network.

In an embodiment, a main ESMC module 10A and HUB 200 may be part of a larger network that may communicate with other base stations, user devices 30A, 30B, computers, and a networks of networks (commonly termed the "Internet"). In an embodiment, a main ESMC module 10A and HUB 200 may communicate data using one or more known digital or analog communication formats including a cellular protocol such as code division multiple access (CDMA), time division multiple access (TDMA), Global System for Mobile Communications (GSM), cellular digital packet data (CDPD), Worldwide Interoperability for Microwave Access (WiMAX), satellite format (COMSAT) format, and local protocol such as wireless local area network (commonly called "Wi-Fi"), Zigbee, WiMAX, and Bluetooth.

In an embodiment, a main ESMC module 10A may communicate with an ESMC module 80A via a first communication protocol and with ESMC module 80B via a second communication protocol. The main ESMC module 10A may further communicate with HUB 200 via a third communication protocol. The main ESMC module 10A may communicate with user device 30A via a fourth communication protocol and with another user device 30B via a fifth communication protocol. In an embodiment, a main ESMC module 10A may communicate with ESMC modules 80A, 80B, and 80C via a first wireless communication protocol and the HUB 200 via another communication protocol. In another embodiment, a main ESMC module 10A may communicate with ESMC modules 80A, 80B, 80C and the HUB 200 via the same communication protocol. The communication protocols may be wired or wireless protocols or a combination thereof.

For example, a main ESMC module 10A may communicate with the HUB 200 using a cellular protocol such as code division multiple access (CDMA), time division multiple access (TDMA), Global System for Mobile Communications (GSM), Worldwide Interoperability for Microwave Access (WiMAX) or COMSAT protocol or using a local protocol including Wi-Fi (IEEE 802.11). The main ESMC module 10A may communicate with one or more ESMC modules 80A, 80B TM 82 via a local signal protocol including Wi-Fi, WiMAX, Bluetooth, and ZigBee (IEEE 802.15.4).

As known to one skilled on the art the Bluetooth protocol includes several versions including v1.0, v1.0B, v1.1, v1.2, v2.0+EDR, v2.1+EDR, v3.0+HS, and v4.0. The Bluetooth protocol is an efficient packet-based protocol that may employ frequency-hopping spread spectrum radio communication signals with up to 79 bands, each band 1 MHz in width, the respective 79 bands operating in the frequency range 2402-2480 MHz Non-EDR (extended data rate) Bluetooth protocols may employ a Gaussian frequency-shift keying (GFSK) modulation. EDR Bluetooth may employ a differential quadrature phase-shift keying (DQPSK) modulation.

The Wi-Fi protocol may conform to an Institute of Electrical and Electronics Engineers (IEEE) 802.11 protocol. The IEEE 802.11 protocols may employ a single-carrier direct-sequence spread spectrum radio technology and a multi-carrier orthogonal frequency-division multiplexing (OFDM) protocol. In an embodiment, one or more user devices 30A, 30B may communicate with a main ESMC module 10A via a Wi-Fi protocol.

The cellular formats CDMA, TDMA, GSM, CDPD, and WiMAX are well known to one skilled in the art. It is noted that the WiMAX protocol may be used for local communication. One or more user devices 30A, 30B may communicate with a main ESMC module 10A via a WiMAX protocol. Additionally, one or more ESMC modules 80A, 80B may communication with a main ESMC module 10A via a WiMAX protocol. The WiMAX protocol is part of an evolving family of standards being developed by the Institute of Electrical and Electronic Engineers (IEEE) to define parameters of a point-to-multipoint wireless, packet-switched communications systems. In particular, the 802.16 family of standards (e.g., the IEEE std. 802.16-2004 (published Sep. 18, 2004)) may provide for fixed, portable, and/or mobile broadband wireless access networks.

Additional information regarding the IEEE 802.16 standard may be found in IEEE Standard for Local and Metropolitan Area Networks—Part 16: Air Interface for Fixed Broadband Wireless Access Systems (published Oct. 1, 2004). See also IEEE 802.16E-2005, IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands (published Feb. 28, 2006). Further, the Worldwide Interoperability for Microwave Access (WiMAX) Forum facilitates the deployment of broadband wireless networks based on the IEEE 802.16 standards. For convenience, the terms "802.16" and "WiMAX" may be used interchangeably throughout this disclosure to refer to the IEEE 802.16 suite of air interface standards.

In an embodiment, ESMC architectures 100A, 100B may be employed to monitor and control one or more environmental conditions and safety devices. The environmental conditions include air temperature, quality, light, and sound, electrical energy, chemical elements including carbon dioxide ($CO_2$), carbon monoxide (CO), humidity, and other air quality and safety measurements. The safety devices may include visual light cameras, infrared cameras, pressure sensors, light control, heat and air conditioning control, sprinkler systems, lock mechanism control, and other controllable safety devices. A controllable system module 82A, 82B may control the operation of one or more environmental conditions and safety devices. In an embodiment, an ESMC module 80A-80C may also control the operation of one or more environmental conditions and safety devices. A main ESMC module 10A and an ESMC module 80A-80C may include one or more environmental sensors, including a visible light camera 16A, an infrared sensor 16B, an audio sensor 16C, a $CO_2$ sensor 16D, a humidity sensor 16E, a temperature sensor 16F, an electrical energy sensor 16G, a pressure sensor 16H, a chemical sensor 16I, and a CO sensor 16J.

Figure 12:
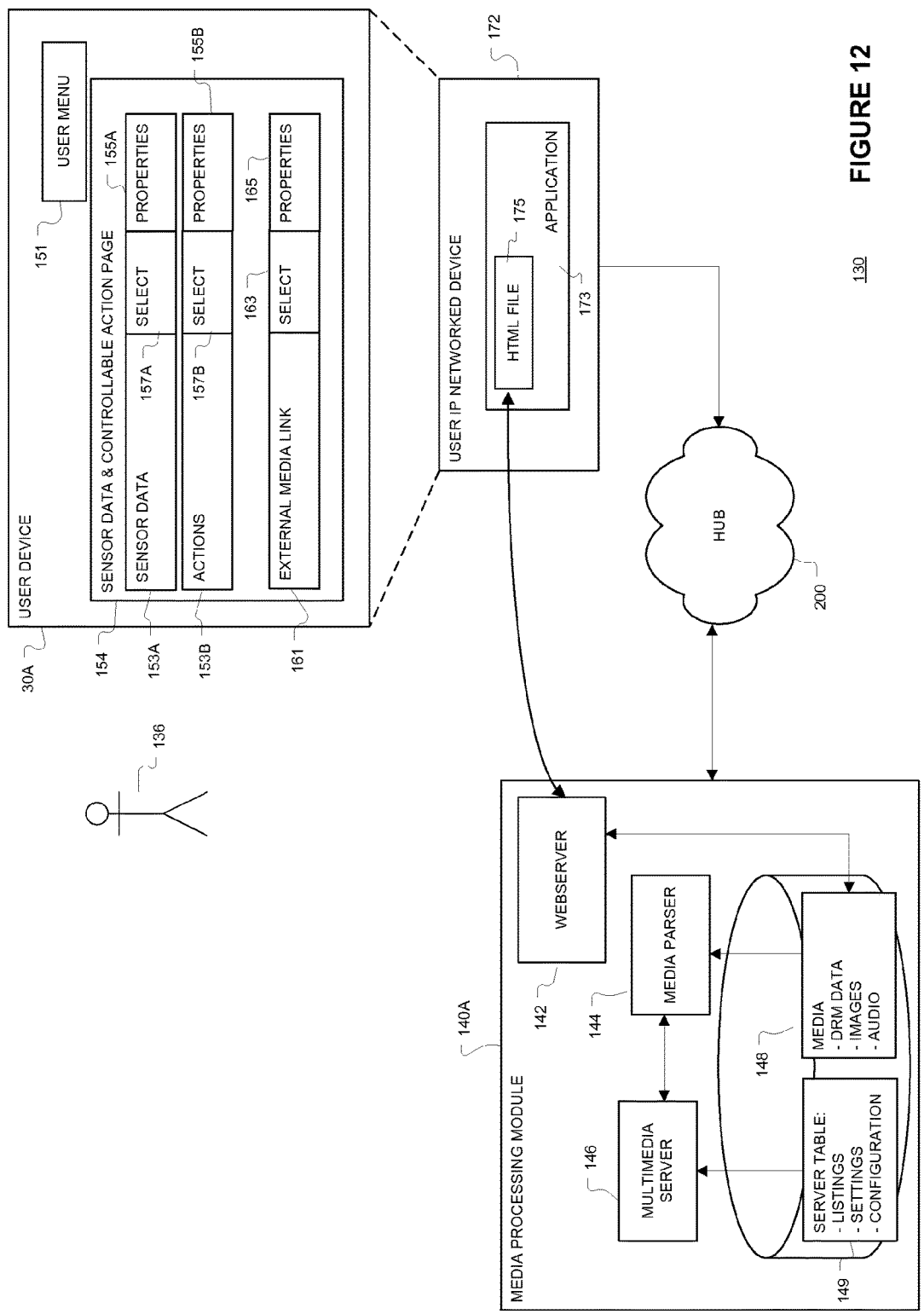
FIG. 12 is a block diagram of ESMC architecture providing a user interface web page according to various embodiments.

In an embodiment, the main ESMC module 10A may include one or more sensors and measure or record sensor data. The main ESMC module 10A may communicate the sensor data to a user device 30A, user device 30B, and ESMC module 80A, 80B, 80C, directly or indirectly. A user device 30A-30B may include an application that may receive and display sensor data from the main ESMC module 10A. In an embodiment, an ESMC module 10A and 80A-80C may include a Media Processing (MP) module 140A as shown in FIG. 12. In such an embodiment, an ESMC module 10A and 80A-80C may communicate data via a user 136 device 30A-B via a webpage 154. The webpage 154 may include sensor data 153A, sensor properties 155A, controllable device actions 153B, controllable device properties 155B, and media upload link option 16I and properties 165. In such an embodiment, a user device 30A-30B may only need a web browser application 173 to communicate with an ESMC module 10A and 80A-80C.

A user 136 via a user device 30A, 30B may communicate data to an ESMC module 10A via architecture 100A, 100B. The data may represent control or setup parameters to be implemented by the main ESMC module 10A or an ESMC module 80A, 80B, and 80C. The data may also represent encoded video or voice to be broadcast or shown by main ESMC module 10A or an ESMC module 80A, 80B, 80C. A main ESMC module 10A may communicate data, parsed data, or commands to an ESMC modules 80A, 80B, 80C. The data may represent control or setup parameters to be implemented by controllable system module 82A, 82B or a device controlled by the module 82A, 82B. The data may also represent encoded video or voice to be broadcast or shown by a controllable system module 82A, 82B or a device controlled by the module 82A, 82B. A main ESMC module 10A may communicate data, parsed data, or commands to a controllable system module 82A, 82B. A controllable system module 82A, 82B may communicate data, parsed data, or commands to a device controlled by the module 82A, 82B.

Figure 3A:
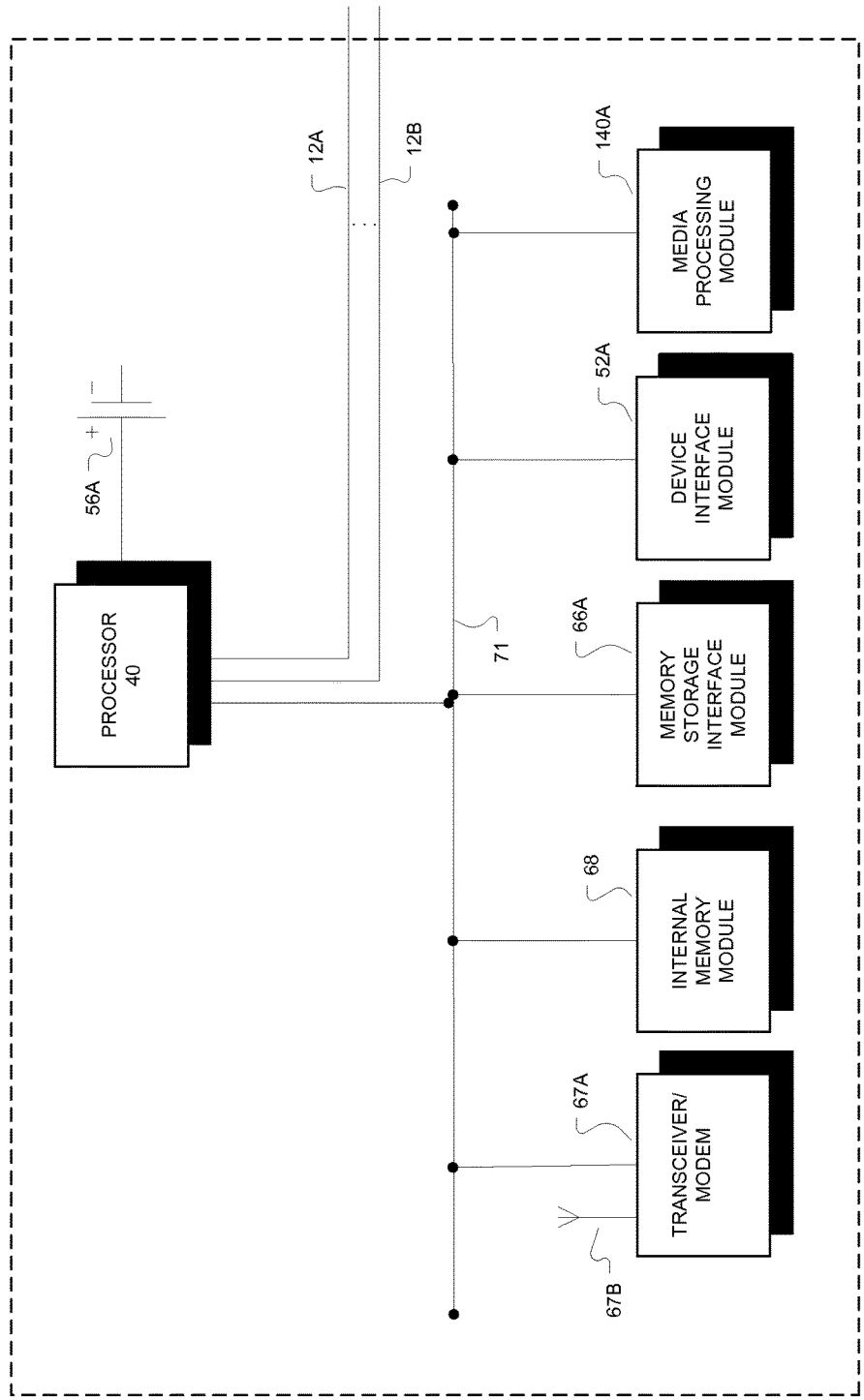
FIG. 3A is a block diagram of a base ESMC according to various embodiments.
Figure 3B:
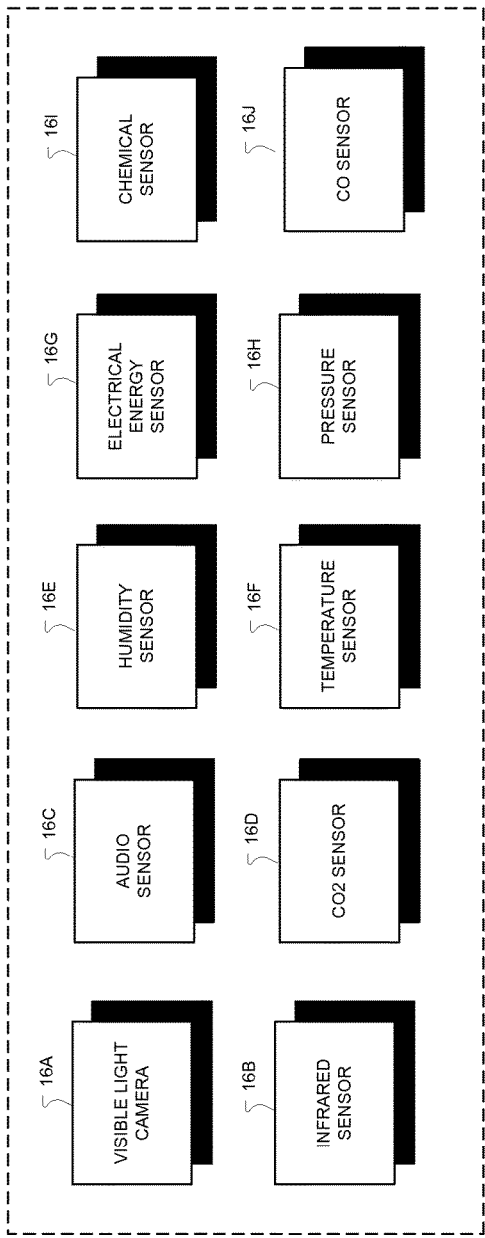
FIG. 3B is a block diagram of ESMC sensor modules according to various embodiments.
Figure 3C:
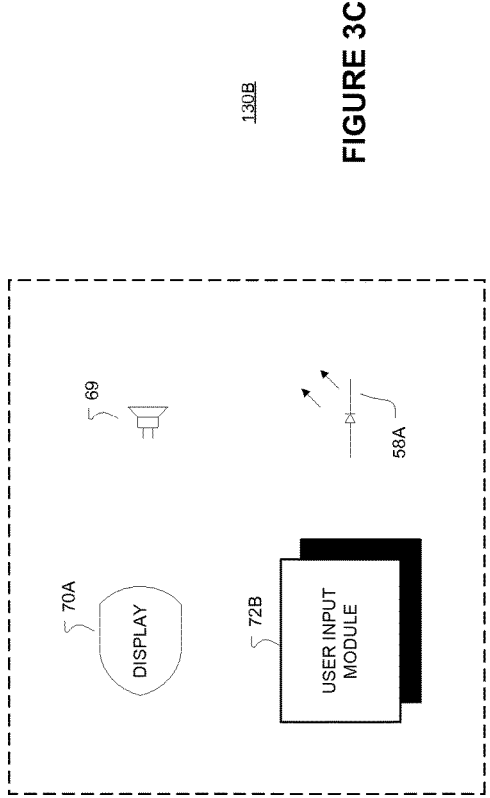
FIG. 3C is a block diagram of ESMC user input and output modules according to various embodiments.

As noted, a main ESMC module 10A and ESMC module 80A, 80B, 80C may include one or more electronic sensor modules 130A as shown in FIG. 3B. A main ESMC module 10A and ESMC module 80A, 80B, 80C may also include one or more direct user 136 input or output modules 130B as shown in FIG. 3C. The user 136 input or output modules 130B may include a visual display 70A, an audio speaker 69, a user input module 72B, and one or more light generating devices 58A. The user input module 72B may include one or more depressible buttons, touch screen (as part of display 70A in an embodiment), and voice processing module.

The voice processing module may operate in cooperation with an audio sensor 16C or a separate microphone located in the main wireless ESMC module 10A or a wireless ESMC module 80A, 80B, 80C and a processor 40. The processor 40 may include an algorithm to decode audio received by an audio sensor 16C into one or more voice commands and audio data. The voice commands may represent control or setup parameters to be implemented by the main ESMC module 10A or an ESMC module 80A, 80B, and 80C. The audio data may also represent voice or audio to be broadcast by main ESMC module 10A or an ESMC module 80A, 80B, 80C. The voice commands may represent control or setup parameters to be implemented by controllable system module 82A, 82B or a device controlled by the module 82A, 82B. The audio data may also represent encoded voice to be broadcast by a controllable system module 82A, 82B or a device controlled by the module 82A, 82B.

In an embodiment, a main ESMC module 10A may have a base ESMC module 11A as shown in FIG. 3A. As shown in FIG. 3A, the base ESMC module 11A may include a central or main processor 40, a transceiver or modulator/demodulator (TMM) 67A, an internal memory module 68, an external, removable memory storage interface module 66A, electronic device interface module 52A, an electrical energy storage device 56A, an antenna 67B, and a media processing module 140A. The processor 40 may be coupled directly to each module 67A, 68, 66A, 52A, and 140A. The processor 40 may also be coupled to one or more modules 67A, 68, 66A, 52A, and 140A via a data bus 71. The processor 40 may also include one or more connections or data lines 12A-B for communicating with one or more sensor modules 16A-16J and user input/output modules 58A, 69, 70A, and 72B.

In an embodiment, a main ESMC module 10A may be coupled to one or more sensor modules 16A-16J and user input/output modules 58A, 69, 70A, and 72B based on the intended use or application of the main ESMC module 10A. The electrical energy storage device 56A may include a battery. An ESMC module 10A may communicate the storage device 56A status to a user device 30A-B. An ESMC module 10A may communicate the storage device 56A status periodically or when a predetermined level, high or low. In an embodiment, a main ESMC module 10A may be couplable to another power source. The additional power source may power the main ESMC module 10A, charge the storage device 56A, or both.

Figure 4B:
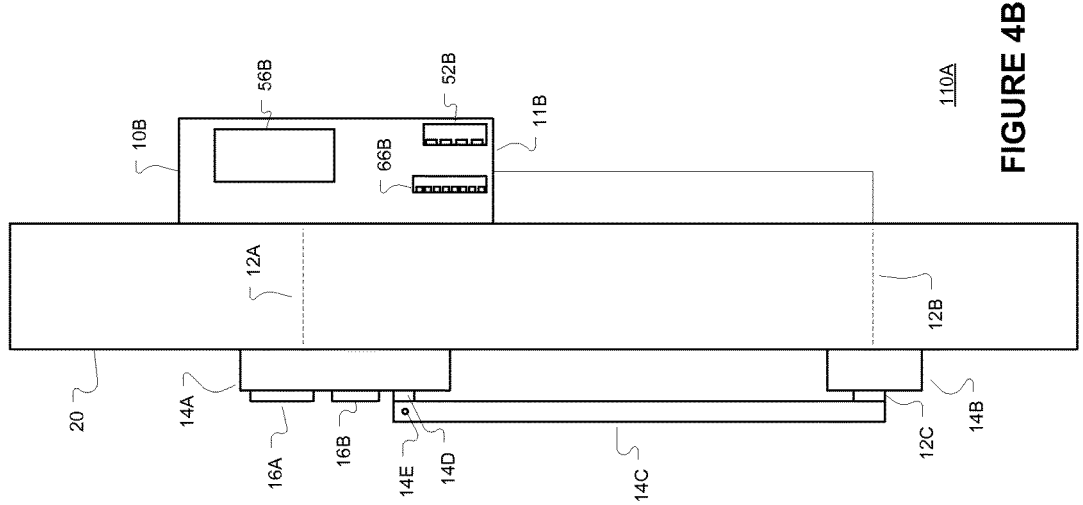
FIG. 4B is a side view of a simplified diagram of a mechanical and electronic door monitor system according to various embodiments.
Figure 4A:
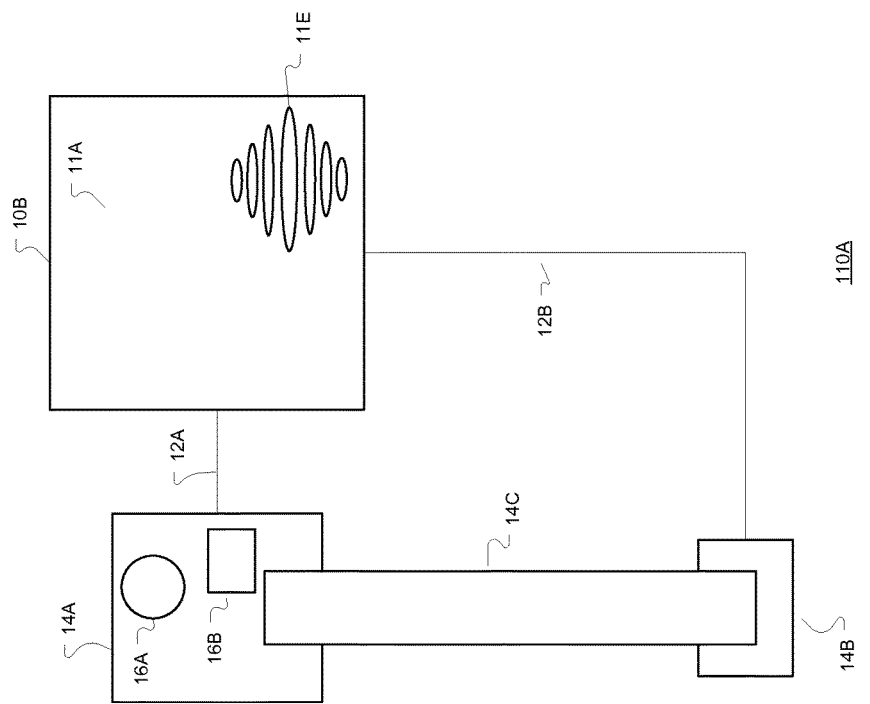
FIG. 4A is a front view of a simplified diagram of a mechanical and electronic door monitor system according to various embodiments.
Figure 4D:
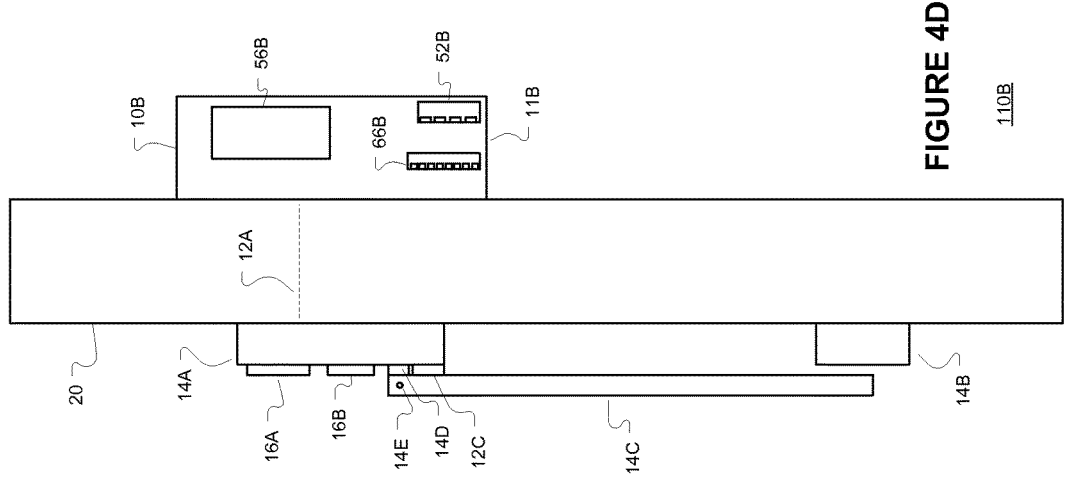
FIG. 4D is a side view of a simplified diagram of a mechanical and electronic door monitor system according to various embodiments.
Figure 4C:
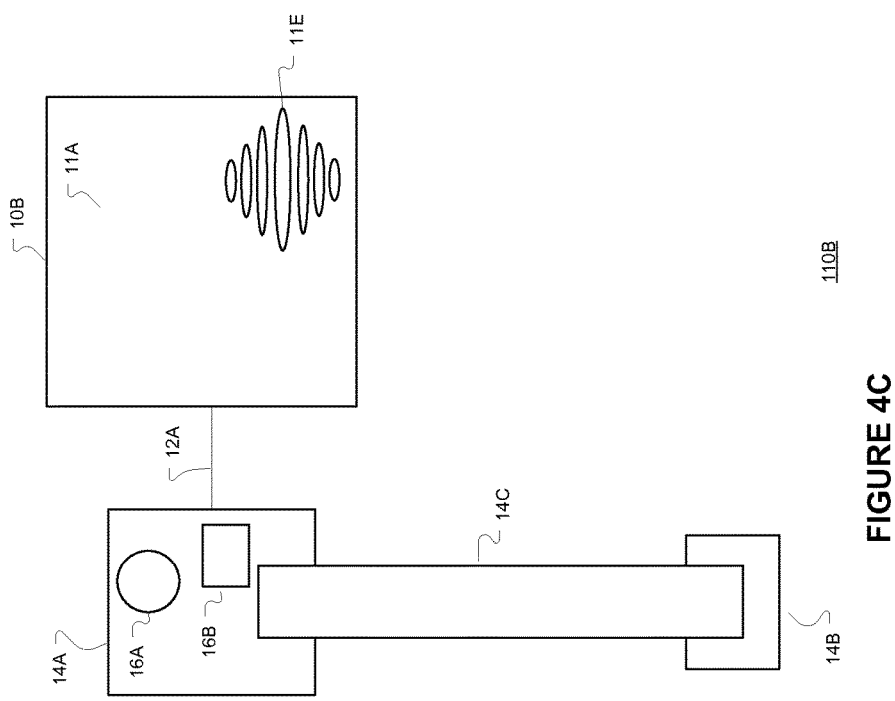
FIG. 4C is a front view of a simplified diagram of another mechanical and electronic door monitor system according to various embodiments.
Figure 4E:
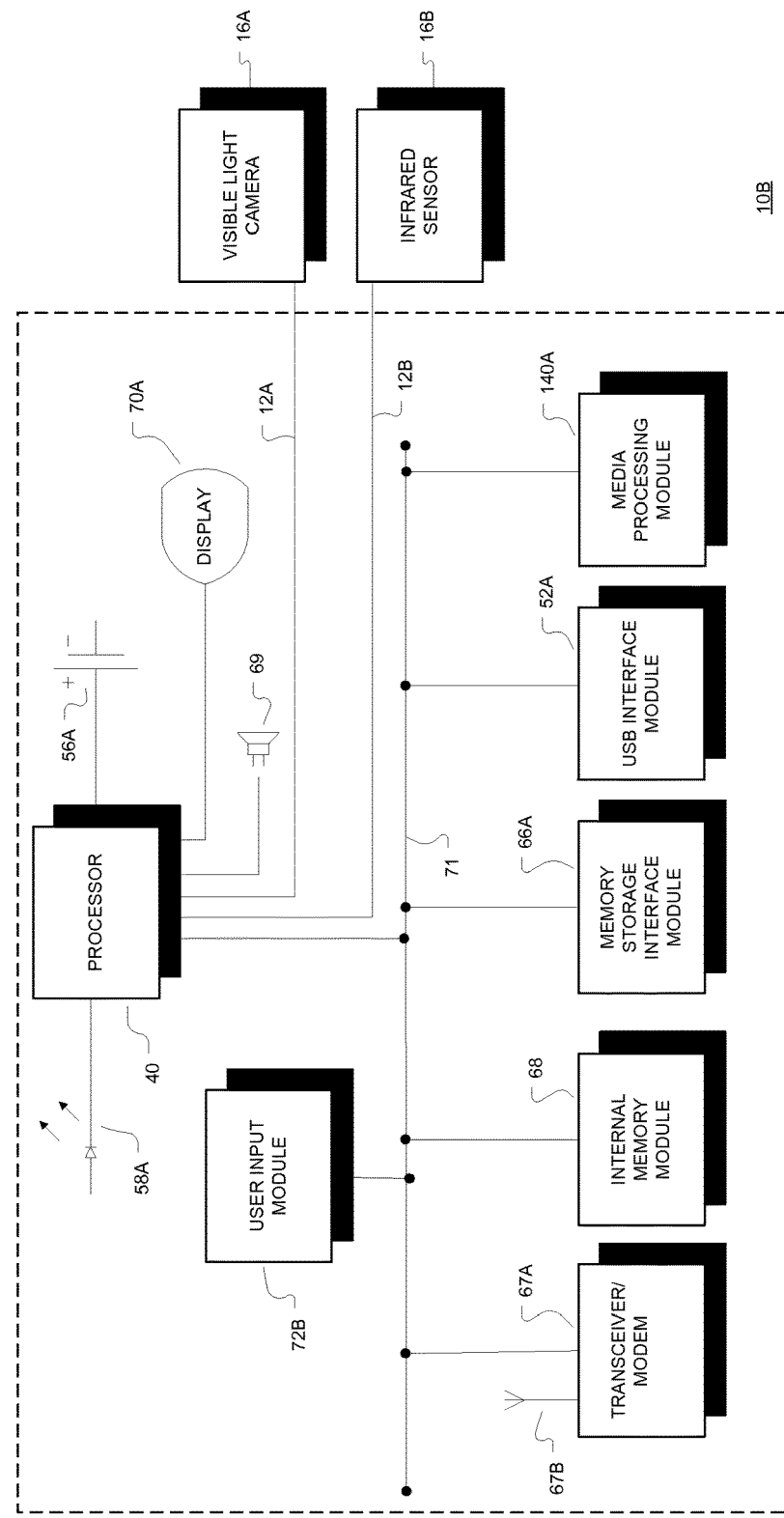
FIG. 4E is a block diagram of a mechanical and electronic door ESMC module according to various embodiments.
Figure 9A:
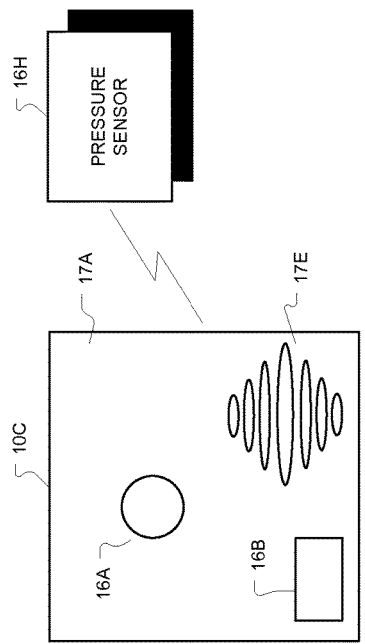
FIG. 9A is a front view of a simplified diagram of a mammal ESMC system according to various embodiments.
Figure 9B:
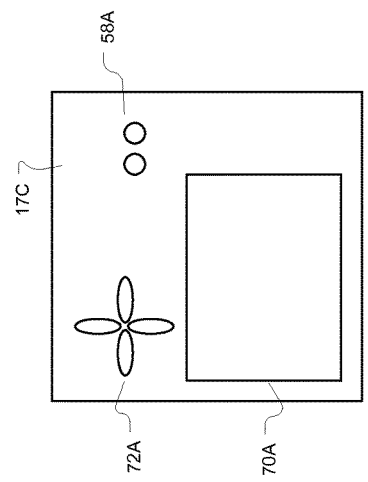
FIG. 9B is a back view of a simplified diagram of a mammal ESMC module according to various embodiments.
Figure 8A:
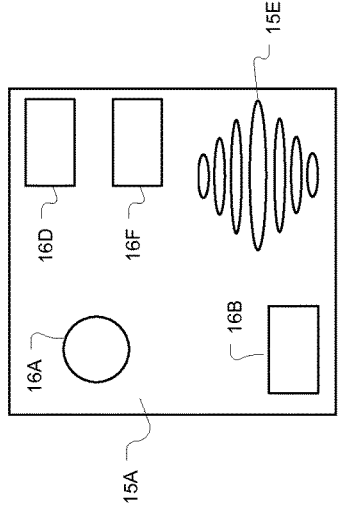
FIG. 8A is a front view of a simplified diagram of an ESMC system according to various embodiments.
Figure 8B:
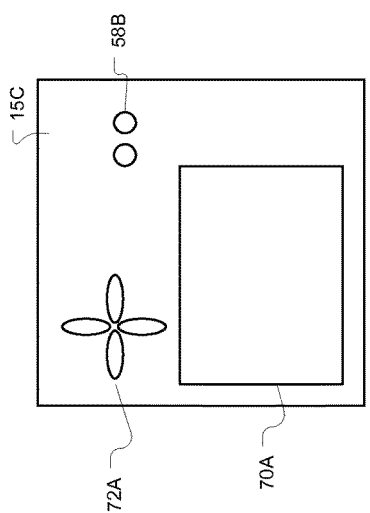
FIG. 8B is a back view of a simplified diagram of an ESMC module according to various embodiments.
Figure 8C:
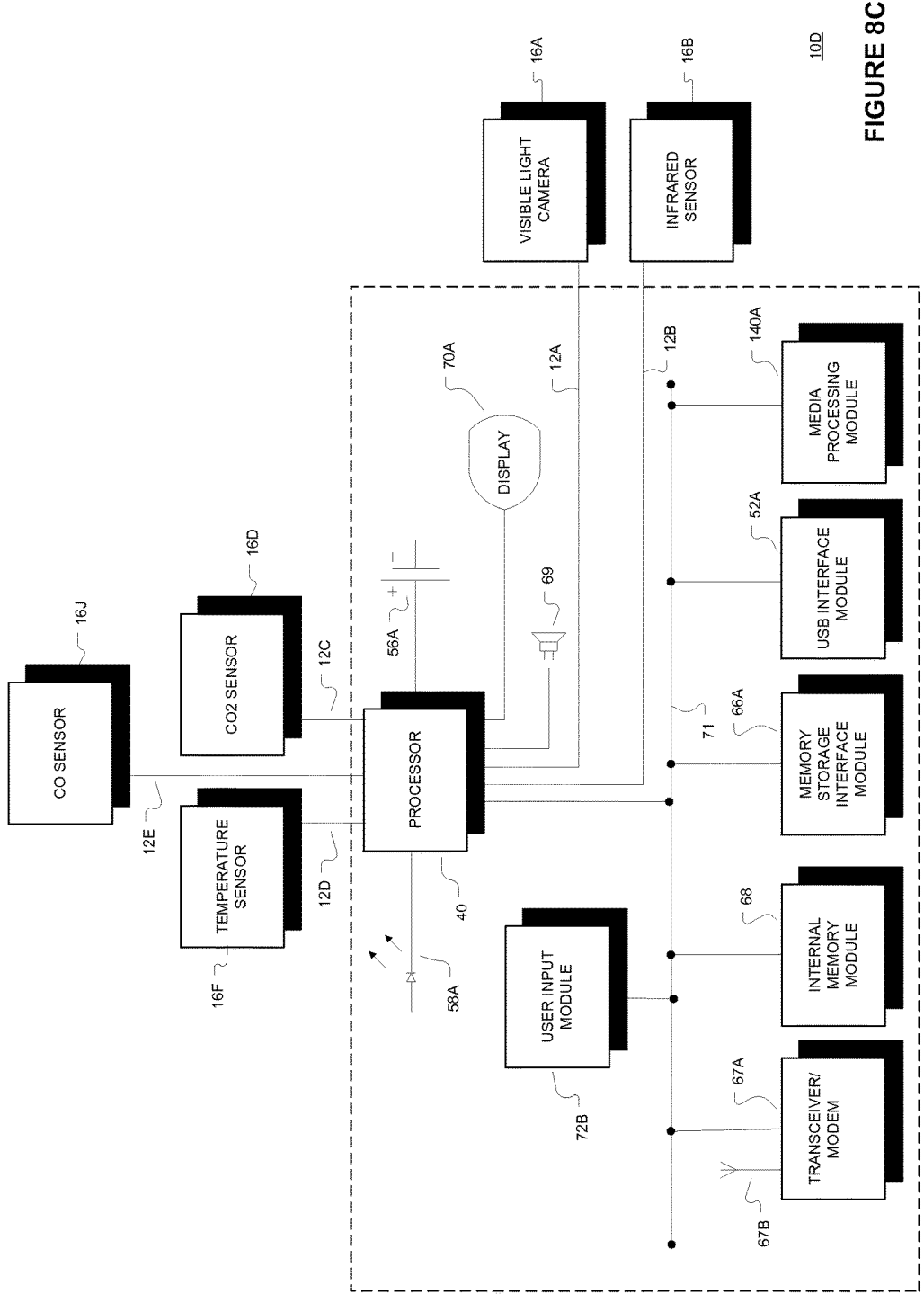
FIG. 8C is a block diagram of an ESMC module according to various embodiments.
Figure 9C:
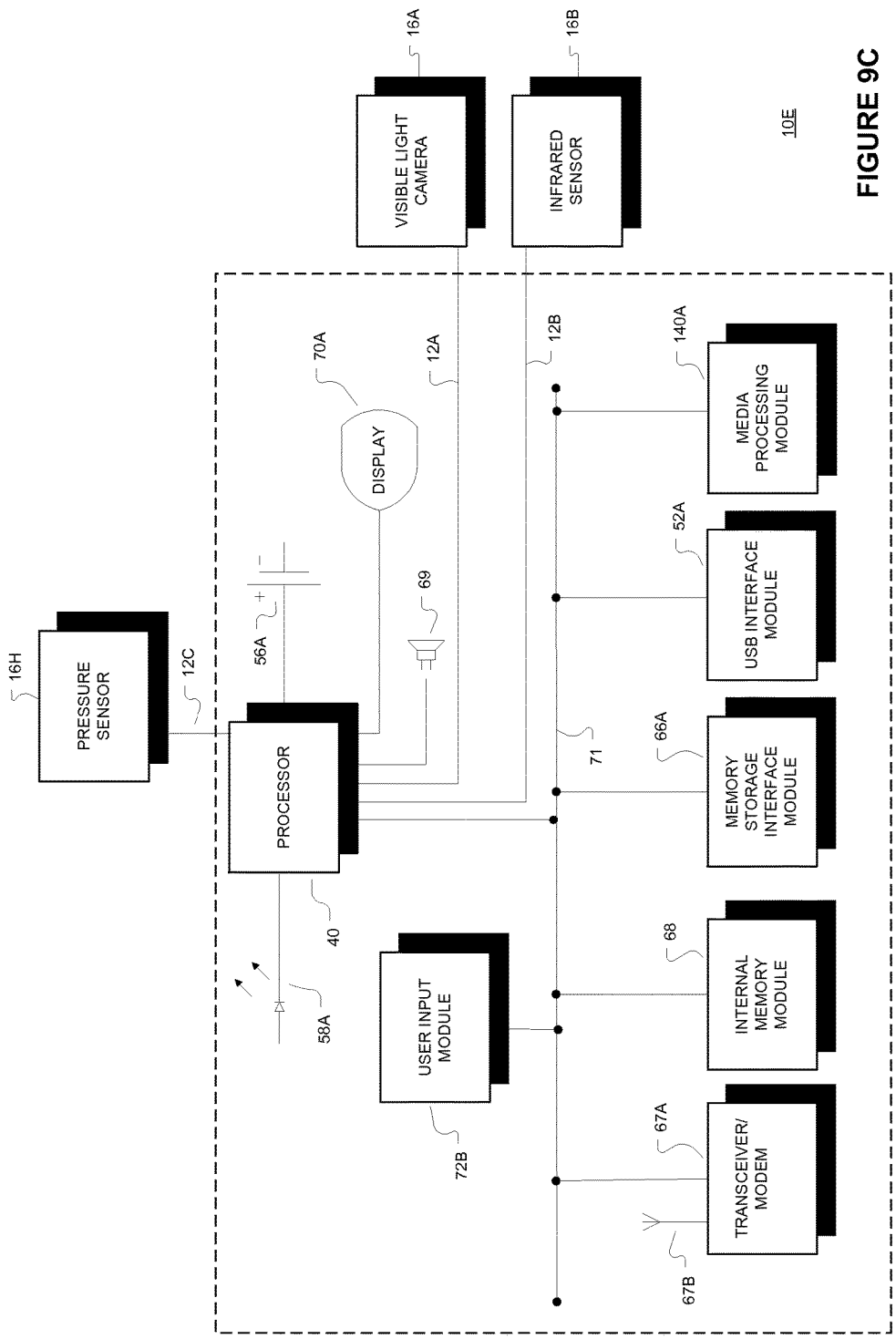
FIG. 9C is a block diagram of a mammal ESMC module according to various embodiments.

FIGS. 4E, 8C, and 9C are simplified block diagrams of base ESMC modules 10B, 10E, and 10F configured for different applications. In an embodiment, a base ESMC module 10B shown in FIG. 4E may be configured for use as a wireless door monitor and control module or wireless security monitor and control module 10B. In another embodiment, a base ESMC module 10E shown in FIG. 8C may be configured for use as a chemical monitor and control module 10E. In an embodiment, a base ESMC module 10F shown in FIG. 9C may be configured for use as a wireless mammal monitor and control module 10F.

FIG. 2A is a simplified block diagram of an ESMC module 80A according to various embodiments. As shown in FIG. 2A, an ESMC module 80A may include a transceiver 82A, a user input module 86A, a speaker 84A, a display 88A, an antenna 87A, and a microphone 83A. The ESMC module 80A may also include an internal electrical energy storage module 56A and be couplable to an on grid power source. In an embodiment, the user input module 86 and display 88 may enable a user to employ an ESMC module 80A to control the operation of a base ESMC module 10A.

The control operations may include communicating an audio or video signal to a base ESMC module 10A for broadcasting, recording, modifying, and deleting audio and video messages. The control operations may further include receiving audio and images recorded by the camera module 16A and reviewing real time audio and images from a camera module 16A. The control operations may also include setting system parameters of the main ESMC module 10A. The control operations may also include directing the operation of or receiving operation status from a controllable system module 82A, 82B. An ESMC module 80A, 80B, 80C transceiver 82 may enable a module 80A, 80B, 80C to communicate signals with a main ESMC module 10A using one or more digital or analog communication protocols.

FIG. 2B is a simplified block diagram of a user device 30A, 30B according to various embodiments. As shown in FIG. 2B, a user device 30A may include a display 34, a memory module 38, a processor 36, a transceiver/modem (TMM) 32, and an antenna 37. The user device 30A TMM 32 may enable the device 30A to communicate signals with a main ESMC module 10A using one or more digital or analog communication protocols. A user device 30A may employ an application in a web browser 173 to receive audio/images from a main ESMC module 10A. The user device 30A may employ an application to forward audio and video signals to a main ESMC module 10A. The user device 30A may employ an application to control the operation of a main ESMC module 10A. The user device 30A may employ an application to control the operation of an ESMC module 80A, 80B, 80C via the main ESMC module 10A.

The user device 30A may employ an application to control the operation of a controllable system module 82A, 82B via the main ESMC module 10A. A user device 30A application may receive operational status and media from an ESMC module 80A, 80B, 80C via a main ESMC module 10A. A user device 30A application may receive operational status and media from a controllable system module 80A, 80B, 80C via a main ESMC module 10A in an embodiment. A user device 30A memory module 39 may store the data received from a main ESMC module 10A in an embodiment. The stored data may include data from an ESMC module 80A, 80B, 80C and a controllable system module 82A, 82B.

FIG. 3A is a simplified block diagram of a main ESMC module 10A. As noted, a main ESMC module 10A may include a processor 40, a user perceptible signal generation module 58A, an electrical energy storage module 56A, an electronic display 70A, a speaker 69, a user input module 72B, a central bus 71, a transceiver/modem (TM) 67A, an antenna 67B, an internal memory module 68, an external memory storage interface module 66A, an electronic interface 52A, a media processing module 140A, and electrical connections 12A, 12B. As shown in FIGS. 4E, 8C, and 9C, the electrical connections 12A, 12B may couple various sensor modules 16A-16J to the processor 40. The processor 40 may reformat the received sensor data for the display 70A, storage in memory 68 or 66A (when present), and transmission to an ESMC module 80A to 80C, a controllable system module 82A, 82B, or a user device 30A, 30B. The display 70A, ESMC modules 80A to 80C, controllable system modules 82A, 82B, and user devices 30A, 30B may require that data including video and audio content be formatted with specific codecs including H.264 and others.

In an embodiment, the transceiver/modem (TMM) 67A, the antenna 67B, the internal memory module 68, the memory storage interface module 66A, the electronic device interface 52A, and the media processing module 140A may be coupled to the processor 40 via a bus 71. In an embodiment, the electronic device interface may be a Universal Serial Bus (USB) complaint interface. In another embodiment, any or all of the user input module 72B, the internal memory module 68, the memory storage interface module 66A, the device interface 52A, and the media processing module 140A may be directly coupled to the processor 40. The display 70A may be any form of electronic display capable of displaying a video or still image including a light emitting diode (LED), liquid crystal display (LCD), TFT, Retina elements or any combination thereof or other type display elements.

In an embodiment, the user perceptible signal generation devices or module 58A may provide an indication of the main ESMC module's 10A operational status including charging status of an internal power storage unit, discharge state of an internal power storage unit, data communication between the wireless main ESMC module 10A and another device including an ESMC module 80A to 80C, controllable system module 82A, 82B, or user device 30A. 30B. In an embodiment, a main ESMC module 10A may include a data memory storage interface ("DMSI") module 66A that may interface with one or more memory devices including a compact flash card, secure digital (SD), miniSD, micro SD, SD high capacity (SDHC), miniSDHC, microSDHC, SD extended capacity, and memory stick. The DMSI module 66A may conform to the SD input-output (SDIO) standard to enable a data memory card and other devices to communicate electronic data with via a main ESMC module 10A. The other devices may include a Bluetooth interface and broadband data interface. The internal memory module 68 may include non-volatile and volatile electronic data internal memory modules ("IDM") 68 where the electronic data may be communicated via the processor 40.

In an embodiment, the TMM 67A may be coupled to an internal antenna 67B. The TMM 67A may be any device capable or communicating data in one or more data communication formats including wireless and wired formats. The TMM 67A may include a transceiver and modem that may communicate digital data or analog signals with one or more electronic devices or modules (80A to 80C, 82A, 82B, 30A, 30B) and the HUB 200. As noted, the HUB 200 may be part of a larger network that may communicate with other hubs, base stations, modules and devices (80A to 80C, 82A, 82B, 30A, 30B), computers, and networks of networks (commonly termed the "Internet").

In an embodiment, the HUB 200 may communicate data with a main ESMC module 10A TMM 67A using one or more known digital communication formats including a cellular protocol such as code division multiple access (CDMA), time division multiple access (TDMA), Global System for Mobile Communications (GSM), cellular digital packet data (CDPD), Worldwide Interoperability for Microwave Access (WiMAX), satellite format (COMSAT) format, and local protocol such as wireless local area network (commonly called "Wi-Fi"), ZigBee, and Bluetooth.

In an embodiment, one or more electronic devices or modules 80A to 80C, 82A, 82B, 30A, 30B may be coupled the HUB 200 or a main ESMC module 10A TMM 67A via a physical or wired connection. The TMM 67A or HUB 200 may employ one or more wired digital or analog data communication protocols to communicate with electronic devices or modules 80A to 80C, 82A, 82B, 30A, and 30B in an embodiment including an Ethernet protocol or Internet protocol (IP), IEEE 802.3. In an embodiment, the antenna 67B may be a circular antenna with multiple, selectable connections to select the wavelength/frequency of signals to be communicated with an electronic devices or modules 80A to 80C, 82A, 82B, 30A, 30B and HUB 200.

In an embodiment, the electrical storage element 56A may be a re-chargeable battery, capacitor, or other device capable of storing electrical energy. It is noted that two or more main ESMC module 10A elements 40, 67A, 68, 66A, 52A, and 71 may be formed on a single integrated circuit including an application specific integrated circuit (ASIC). Any of the components previously described can be implemented in a number of ways, including embodiments in software. Any of the components previously described can be implemented in a number of ways, including embodiments in software. Thus, the wireless base ESMC module 10A elements 40, 67A, 68, 66A, 52A, and 71 may all be characterized as "modules" herein.

The modules may include hardware circuitry, single or multi-processor circuits, memory circuits, software program modules and objects, firmware, and combinations thereof, as desired by the architect of the architecture 100A, 100B and modules 10A-10F, 80A, 80B, 80C, 82A, 82B and as appropriate for particular implementations of various embodiments. The apparatus and systems of various embodiments may be useful in applications. They are not intended to serve as a complete description of all the elements and features of apparatus and systems that might make use of the structures described herein.

As noted, a main ESMC module 10A may be configured to function as in a variety of monitor and control applications including for residential and commercial applications. Depending on the application, a main ESMC module 10A may be directly coupled to one or more sensor modules 16A-16J and user input/output modules 58A, 69, 70A, and 72B and indirectly coupled to ESMC modules 80A, 80B, 80C and controllable system modules 82A, 82B. FIG. 4E is a simplified block diagram of a main ESMC module 10B according to an embodiment. As shown in 4E, the main ESMC module 10B includes the main ESMC module 10A (FIG. 3A), a user input module 72B, a speaker 69, a display 70A, a visible light camera 16A, a light generation module 58A, and an infrared sensor 16B. In an embodiment, the main ESMC module 10B may employed in a door monitor system 110A, 110B and a security camera system 10C.

Simplified door monitor and control (DMC) systems 110A, 110B according to various embodiments are shown in FIGS. 4A-4D. FIGS. 4A-4B are simplified diagrams of a first DMC system 110A according to an embodiment. As shown in FIGS. 4A-4B, the first DMC system 110A may include a main ESMC module 10B and a mechanical knocker base 14A, a mechanical knocker plate 14B, a mechanical knocker striker 14C, and an electronic knocker (main ESMC) module 10B (as shown in FIG. 4E). As shown in FIGS. 4A-4B, the mechanical knocker base 14A may include sensors, in particular a camera/microphone 16A and an infrared camera 16B. The knocker plate 14B may include an electrical contact, switch, or relay 12C. The main ESMC module 10B may be coupled to the mechanical knocker base 14A sensors 16A, 16B via an electrical connectors 12A. The main ESMC module 10B may also be coupled to the electrical contact, switch, or relay 12C via an electrical connector 12B.

FIGS. 4C-4D are simplified diagrams of a second DMC system 110B according to an embodiment. As shown in FIGS. 4C-4D, the second DMC system 110B may include a main ESMC module 10B and a mechanical knocker base 14A, a mechanical knocker plate 14B, a mechanical knocker striker 14C, and an electronic knocker (main ESMC) module 10B (as shown in FIG. 4E). As shown in FIGS. 4C-4D, the mechanical knocker base 14A may include sensors, in particular a camera/microphone 16A and an infrared camera 16B and an electrical contact, switch, or relay 12C. The main ESMC module 10B may be coupled to the mechanical knocker base 14A sensors 16A, 16B, 12C via an electrical connectors 12A.

In an embodiment, when a mechanical striker 14C of a door monitor system 110A, 110B is moved, the electrical contact, switch, or relay 12C may close or open to create a trigger event. The main ESMC module 10B may detect the trigger event via the electrical connections 12A, 12B. In an embodiment, the main ESMC module 10B may communicate one or more signals to an ESMC module 80A, 80B, 80C, user device 30A, 30B, or controllable system module 82A, 82B when a trigger event occurs. The controllable system modules 82A, 82B may control lights, security systems, locking systems, and audio systems. When a trigger event occurs, a main ESMC module 10B may direct a controllable system module 82A, 82B to turn on one or more lights or groups including lights about the environment where the main ESMC module 10B is physically present.

A main ESMC module 10B may communicate the trigger event to a security system or group via a controllable system module 82A, 82B. A main ESMC module 10B may activate one or more locking systems when a triggering event occurs via a controllable system module 82A, 82B. A main ESMC module 10B may activate one or more audio systems when a triggering event occurs via a controllable system module 82A, 82B. A main ESMC module 10B may activate one or more other sensors when a triggering event occurs including the visible camera sensor 16A and infrared camera 16B. The main ESMC module 10B may record images and audio from the sensors 16A, 16B for a predetermined time interval after a trigger event occurs. The main ESMC module 10B may forward recorded or live images and audio from the sensors 16A, 16B to an ESMC module 80A, 80B, 80C, user device 30A, 30B, or controllable system module 82A, 82B for a predetermined time interval after a trigger event occurs. The main ESMC module 10B may forward recorded or live images and audio from the sensors 16A, 16B to an ESMC module 80A, 80B, 80C, user device 30A, 30B, or controllable system module 82A, 82B after a trigger event occurs until a user 136 requests the transmissions to end.

Figure 5B:
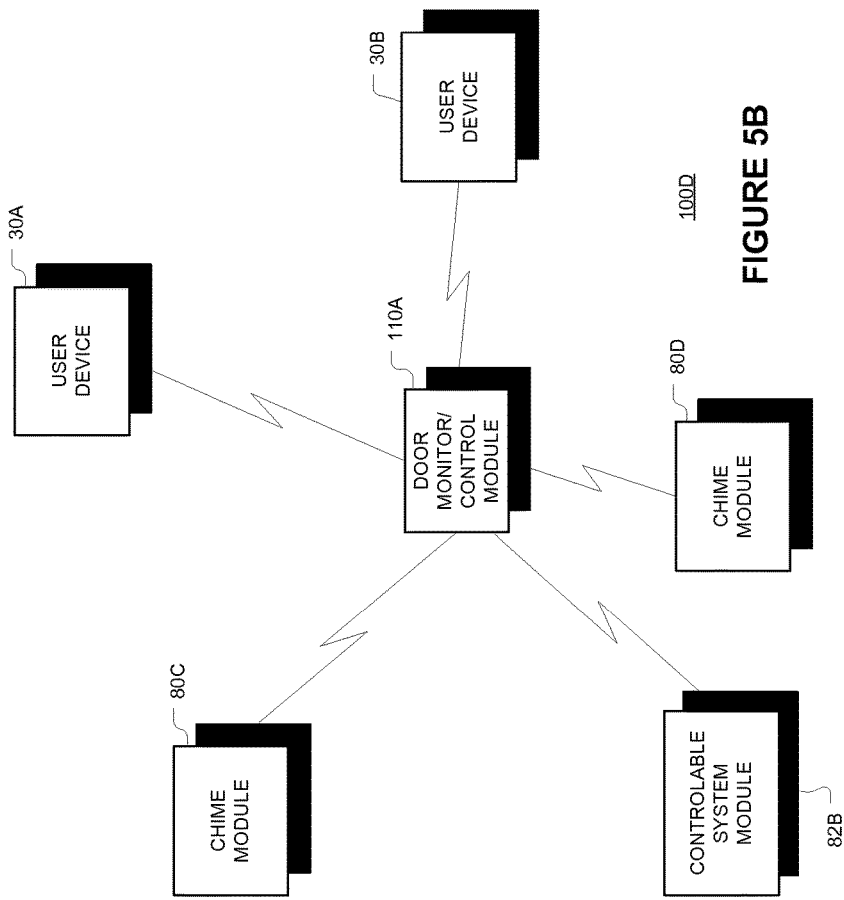
FIG. 5B is a simplified diagram of another door monitor and control architecture according to various embodiments.
Figure 5A:
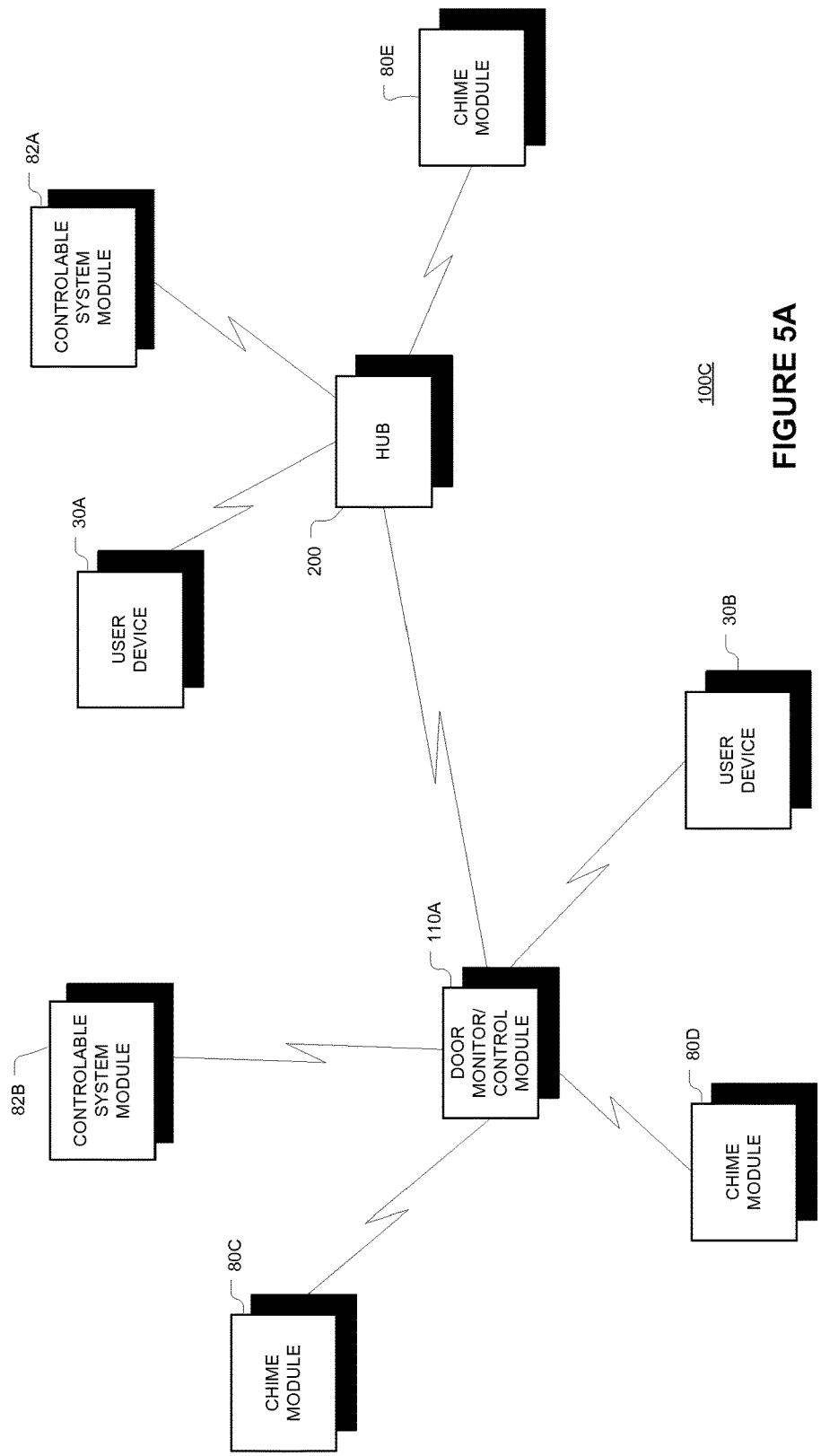
FIG. 5A is a simplified diagram of door monitor and control architecture according to various embodiments.

In another embodiment, the main ESMC module 10B may create a trigger event when motion or sound is detected by another sensor, including sensors 16A, 6B. In an embodiment, an ESMC module 80A, 80B, 80C may also create a trigger event when motion or sound is detected by another sensor including a microphone 83A, visible camera 16A, or infrared camera 16B. An ESMC module 80A, 80B, 80C may communicate the trigger event to the main ESMC module 10B. In a DMC system 110A, 110B, the ESMC modules 80A, 80B, 80C may be chime modules (FIGS. 5A, 5B).

It is noted the main ESMC module 10B and ESMC modules 80A, 80B, 80C may communicate a movement event signal, audio signal, a combined audio/video signal, and a battery status signal based on a trigger event or user request from an ESMC modules 80A, 80B, 80C or user device 30A, 30B. A user may communicate signals to a main ESMC module 10B via a ESMC (chime) module 80A, 80B, 80C, user device 30A, 30B, or user input device 72A (FIG. 4F) of a main ESMC module 10B. The user communicated signal may include an audio signal, video signal, or a command signal. In an embodiment, the command signal may also include directing the main ESMC module 10B speaker 69 or an ESMC (chime) module 80A, 80B, 80C speaker 83A play a pre-recorded or standard message(s) including "no solicitation permitted" and others.

FIG. 4A is a front view and FIG. 4B is a side view of a simplified diagram of a DMC system 110A according to various embodiments. As shown in FIGS. 4A and 4B and noted above, the DMC system 110A may include a mechanical knocker base 14A, a mechanical knocker plate 14B, a mechanical knocker striker 14C, a main ESMC module 10B, a visible light camera/microphone 16A, an infrared camera 16B, electrical connectors 12A, 12B, and electrical contact, switch, or relay 12C. In an embodiment, the striker 14C may be hingably coupled to the knocker base 14A via a hinge arm 14C and a hinge pin 14E. In other embodiments one or more strikers 14C may be coupled to one or more bases 14A via one or more hinge arms and one or more hinge pins. In an embodiment, a hinge pin 14E may be part of the hinge arm 14D or striker 14E. In an embodiment, a DMC system 110A, 110B may not include a strike plate 14B and the striker(s) 14C may be shaped to strike a door 20 (FIG. 4B, 2D) to create a mechanically generated sound. In another embodiment, a DMC system 110A, 110B may include strike plates 14B and the striker(s) 14C may be shaped to strike one or more strike plates 14B to create a mechanically generated sound. The knocker base 14A, striker 14C, and strike plate 14B may have various shapes and be formed of many different materials including metals, alloys, woods, glass, and polymers.

As shown in FIGS. 4A-4D, the camera/microphone 16A and infrared camera 16B may be located in the knocker base 14A. In an embodiment, a microphone may be separate from the camera 16A. The microphone may be located in the strike plate in an embodiment. As shown in FIG. 4B, in door monitor system 110A, a switch, relay, electrical contract or sensor 12C may be located between the striker 14C and strike plate 14B. The contract or sensor 12C may be coupled to the main ESMC module 10B processor 40 (FIG. 4E) via one or more electrical conductors. 12A, 12B. The main ESMC module 10B processor 40 (FIG. 4E) may monitor the contact or sensor 12C to determine when the striker 14C is moved away from the strike plate 14B or door 20 indicating a strike event. In an embodiment, the processor 40 may also monitor and analyze signals on the microphone, visible camera 16A and infrared camera 16B to determine when a strike event has occurred.

As shown in FIG. 4D, the contact or sensor 12C may also be located on the knocker base 14A. The contact or sensor 12C may be located below the knocker hinge 14D. In an embodiment, the main ESMC module 10B processor 40 may determine a strike event has occurred by monitoring the contact or sensor 12C conductivity. In an embodiment, a main ESMC module 10B may employ the algorithm 120A shown in FIG. 6A to process strike events. In an embodiment, when the processor 40 determines that a strike event has occurred (activity 122), the processor 40 may direct the transceiver/modem (TMM) 67B to communicate the event to ESMC modules 80A-80C, user devices 30A, 30B, and controllable system modules 82A, 82B (activity 124). Via a controllable system module 82A, 82B, a main ESMC module 10B may activate one or more lights or light groups. A controllable system 82A, 82B may be coupled or part of a controllable lighting system or network. Based on a request or command from a main ESMC module 10B, the controllable system 82A, 82B may activate lights in proximity to the systems 110A, 110B, lights further from the systems 110A, 110B, and random lights near the systems 110A, 110B. In an embodiment, a system 110A, 110B may installed or located in a residential environment. The system 110A, 110B may activate one or more lights to help the system 110A, 110B visualize persons near the system. The system 110A, 110B may activate one or more lights via a controllable system module 82A, 82B to create the impression that residential environment is occupied.

Via a controllable system module 82A, 82B, a main ESMC module 10B may play one or more sounds at various locations. A controllable system 82A, 82B may be coupled or part of a controllable sound system or network. Based on a request or command from a main ESMC module 10B, the controllable system 82A, 82B may generate sound via speakers in proximity to the systems 110A, 110B, sounds further from the systems 110A, 110B, and random sounds near the systems 110A, 110B. The system 110A, 110B may generate one or more sounds, sound patterns, or sound playlists via a controllable system module 82A, 82B to create the impression that residential environment is occupied.

In an embodiment, the processor 40 may direct the TMM 67B to communicate a trigger event to user devices 30A, 30B. A user 136 may configure a user device (via application 173 and page 154) to receive main ESMC module 10B and ESMC modules 80A-C updates. In an embodiment, a processor 40 may determine whether any user devices 30A, 30B are configured to receive wireless base ESMC module 10B updates (activity 126). The processor 40 may review server table 149 to determine which user devices are associated with the main ESMC module 10B. As noted, a main ESMC module 10B may forward images/audio from the cameras 16A, 16B to the active user devices 30A, and 30B (activity 128). In an embodiment, a main ESMC module 10B may also forward images/audio from the cameras 16A, 16B to the actively coupled ESMC modules 80A to 80C.

A main ESMC module 10B may also record images/audio to memory including internal memory 68 or external memory 66A (activity 129). The internal memory 68 or external memory 66A may represent the memory 148, 149 of module 140A of FIG. 12. The memory processing module (MPM) 140A may also include one or more memory modules to store the databases 148, 149. A main ESMC module 10B may continue to forward audio and images from the cameras 16A, 16B for a predetermined period of time or until a user selects to end such transmissions via a user device 30A, 30B, ESMC module 80A to 80C user input module 86 (FIG. 4E), or controllable system module 82A, 82B.

In an embodiment, a registered user via a main ESMC module 10B, user device 30A, 30B, ESMC module 80A to 80C, or controllable system module 82A, 82B may use voice commands to control the operation of one or more main ESMC modules 10B, ESMC module 80A to 80C, or controllable system module 82A, 82B. A main ESMC modules 10B, ESMC module 80A to 80C, or controllable system module 82A, 82B may monitor audio activity via a microphone to determine when a user issues a valid command A main ESMC modules 10B, ESMC module 80A to 80C, or controllable system module 82A, 82B may authenticate a user request based on the user's voice patterns in an embodiment. A main ESMC modules 10B, ESMC module 80A to 80C, or controllable system module 82A, 82B may authenticate a user request based on a code word or password the user provides by audio in an embodiment.

A main ESMC module 10B may also receive audio or control signals from a user via a main ESMC module 10B, ESMC module 80A to 80C, or controllable system module 82A, 82B and broadcast the audio signals or other signal through via the speaker 69 and grill 11E. In an embodiment, a user via a main ESMC module 10B, ESMC module 80A to 80C, or controllable system module 82A, 82B may direct a main ESMC module 10B to broadcast one or more prerecorded messages via the speaker 69. The prerecorded messages may be recorded by a user or included in the internal memory module 68 or provided via the external memory interface 66A. A user device 30A, 30B may include an application 173 may enables a user to review images/audio from the cameras 16A, 16B in real time or batch mode. A user device 30A, 30B application may also enable a user to control the operation of the main ESMC module 10B, ESMC module 80A to 80C, or controllable system module 82A, 82B including strike event sensitivity, audio messages for future or current broadcast, modify or review current audio messages, and modify, review, move, or delete images from a main ESMC module 10B, ESMC module 80A to 80C, or controllable system module 82A, 82B memory 66A, 68, 149, 148.

As shown in FIGS. 4A to 4D, a main ESMC module 10B may include a speaker opening or grill 11E on its face 11A. In an embodiment, a main ESMC module 10B may be configured to be located on a door 20 inside panel as shown in FIGS. 4B, 4D. A main ESMC module 10B speaker 69 (FIG. 4E) may generate acoustic signals to be transmitted through the door 20 via the grill or openings 11E. As shown in FIGS. 4B, 4D, the wireless base ESMC module 10B encasing body may include several ports 52B, 66B to expose one or more interface modules 66A, 52A (FIG. 4E). In an embodiment, the interface 52A may be a device specific interface or a universal serial bus (USB) interface. The interface 66A may be memory card interface including a secure digital (SD) memory interface. As also shown in FIGS. 4B, 4D, a main ESMC module 10B may also include an electrical energy storage module 56A (FIG. 4E) access panel 56B. The access panel 56B may enable a user 136 to access, charge, or replace a main ESMC module 10B electrical energy storage unit 56A. An ESMC module 80A-C may also include an electrical energy storage module 56A and an access panel. An ESMC module 80A-C access panel may enable a user 136 to access, charge, or replace an ESMC module 80A-C electrical energy storage unit 56A in an embodiment.

Figure 4F:
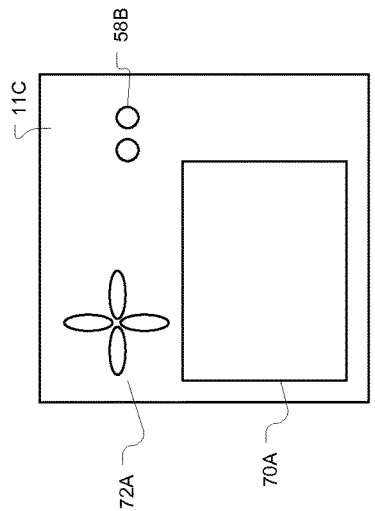
FIG. 4F is a back view of a simplified diagram of a door ESMC module according to various embodiments.

FIG. 4F is a simplified diagram of a main ESMC back face 11C. As shown in FIG. 4F, a main ESMC module 10B physical case back face 11C (opposite the door 20) may include user perceptible signal generation devices port 58B, a display 70A, and user input devices 72A. The ports 58B may enable user to view detectable signals 58A (FIG. 4E) to be communicated to a user via the ports 58B. The display 70A may show system control screens, real time camera images from the cameras 16A, 16B, and stored camera 16A, 16B images. The control screens may include options to couple one or more chime or ESMC systems 80A, 80B, and 80C, user devices 30A, 30B, HIB 200, and controllable system modules 82A, 82B to a main ESMC module 10B. The main ESMC module 10B control screens may also include security options and image storage options. A user 136 via a main ESMC module 10B input modules 72A may navigate through control screens select or enter options within the screens.

Figure 7A:
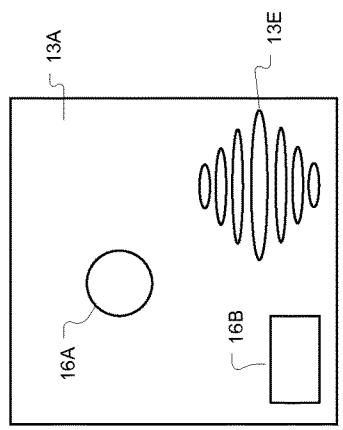
FIG. 7A is a front view of a simplified diagram of a security monitor and control system according to various embodiments.
Figure 7B:
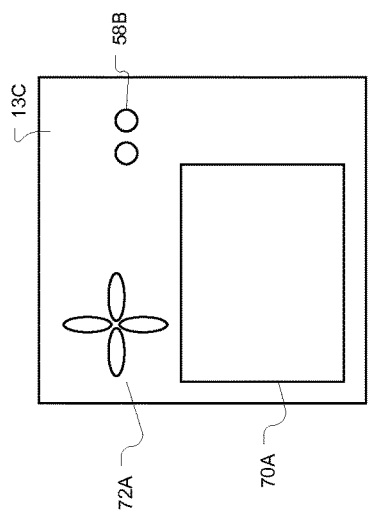
FIG. 7B is a back view of a simplified diagram of a wireless security monitor and control module according to various embodiments.

As noted in an embodiment, a main ESMC module 10B shown in FIG. 4E may be employed in other applications. A main ESMC module 10B may be employed in a security system 110C (FIGS. 7A, 7B) and a lighting and sound monitoring and control system 110F (FIGS. 10A, 10B) in an embodiment. FIG. 7A is a front view of a simplified diagram of a security system 110C according to various embodiments. FIG. 7B is a back view of a simplified diagram of a security system 110C according to various embodiments. As shown in FIGS. 7A and 7B, the security system 110C may include a visible light camera 16A, an infrared camera 16B and a speaker grill 13E on its front face 13A. The security system 110C may include a user input panel 72A, a display 70A, and a light generation passage ports 58B on a back panel 13C.

In an embodiment, a security system 110C may communicate live or recorded images/audio from the cameras 16A, 16B when requested by a user 136 via a user device 30A, 30B or input panel 72A. A security system 110C may also be configured to communicate live or recorded images/audio from the cameras 16A, 16B to a user device 30A, 30B when motion or sound is detected by either camera 16A, 16B. The security monitor system 10C may communicate records images from the cameras 16A, 16B when requested by a user via a user device 30A, and 30B. A security system 110C may the algorithm shown in FIG. 6B in an embodiment during operation.

Figure 6B:
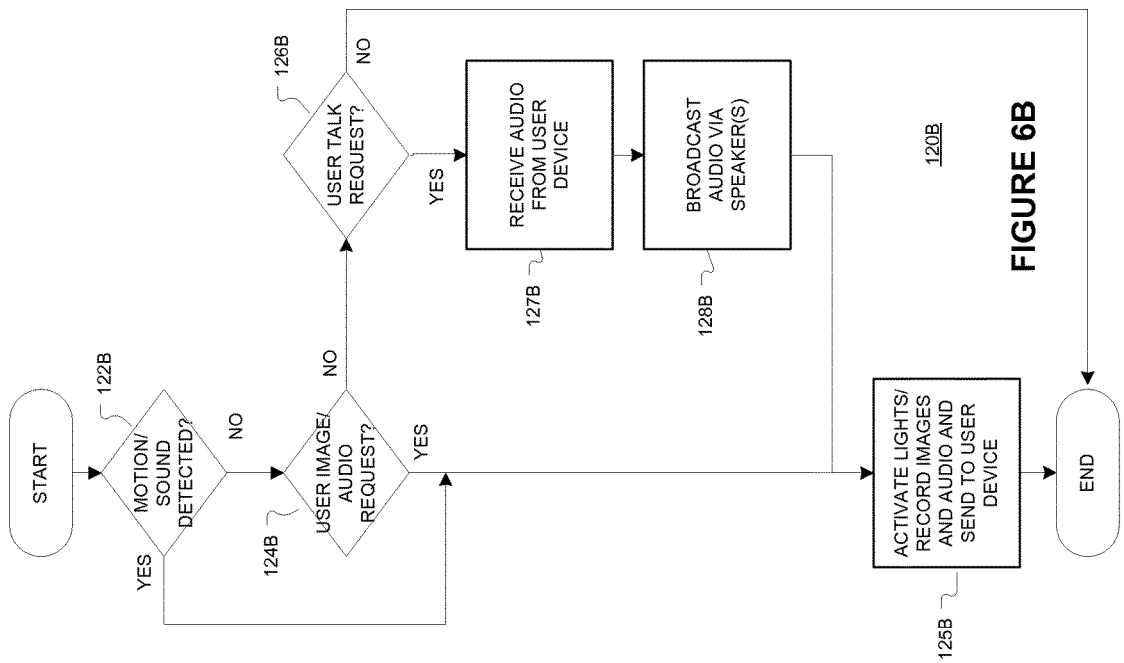
Figure 6A:
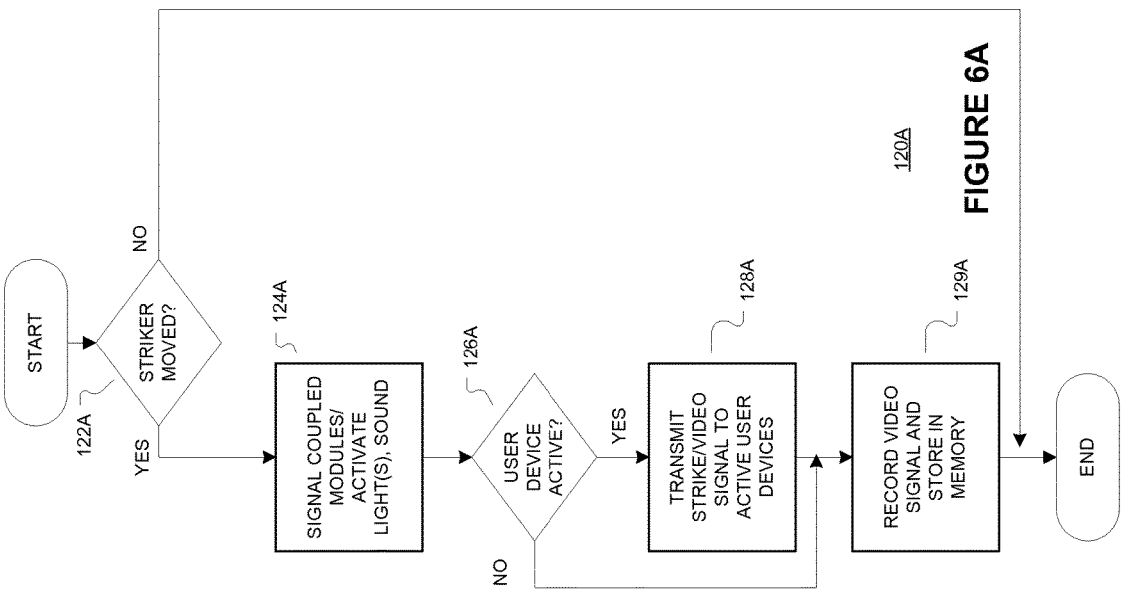

As shown in FIG. 6B, when motion or sound is detected by a camera sensor 16A, 16B (activity 122B) or a user requests images/audio from a camera sensor 16A, 16B (activity 124B), a security system 110C and a DMC system 110A, 110B may record images from the cameras 16A, 16B and send the images to a user via a user device 30A, 30B, controllable system module 82A, 82B, or ESMC module 80A, 80B, 80C (activity 125B). In an embodiment, audio is generally included with image data. A system 110A-C may also activate light(s) or generate audio via a controllable system module 82A, 82B as noted above. A user may also desire to broadcast images and audio via a system 110A-C (activity 126B). A user via a user device 30A, 30B, controllable system module 82A, 82B, or ESMC module 80A, 80B, 80C may communicate image(s) and audio to be broadcast by a system 110A-C (activity 128B). A system 110A-C may also activate light(s) or generate audio via a controllable system module 82A, 82B while broadcasting the images and audio. A system 110A-C may also broadcasting the images and audio via a controllable system module 82A, 82B.

As noted, a base ESMC module 11A may be coupled to various sensors modules 130A and input/output modules 130B to form a variety of main ESMC modules 10A-10E. FIG. 8C is a simplified block diagram of a main ESMC module 10D according to various embodiments. The ESMC module 10D may be employed in the environmental monitoring and control (EMC) system 110D shown in FIGS. 8A-8B. As shown in 8C, the main ESMC module 10D may include the base ESMC module 11A, a user input module 72B, a speaker 69, a display 70A, a visible light camera 16A, a light generation module 58A, an infrared sensor module 16B, a temperature sensor module 16F, a carbon-monoxide (CO) sensor module 16J and a carbon dioxide ($CO_2$) sensor module 16D.

FIG. 8A is a front view of a simplified diagram of an environmental monitoring and control (EMC) system 110D according to various embodiments. FIG. 8B is a back view of a simplified diagram of an EMC system 110D according to various embodiments. As shown in FIGS. 8A and 8B, an EMC system 110D front face 15A may include a visible light camera module 16A, an infrared camera module 16B, a temperature sensor module 16F, a $CO_2$ sensor module 16D, a CO sensor module 16J, and a speaker grill 15E. An EMC system 110D rear face 15C may include a user input panel module 72A, a display module 70A, and light generation passage ports 58B. In an embodiment, an EMC system 110D may communicate live or records images and audio from the cameras 16A, 16B and sensor modules 16D, 16F, 16J readings to user device 30A, and 30B, controllable system module 82A, 82B, user display module 70A, and ESMC modules 80A-C when requested by a user 136. A user may generate a request via a user device 30A, and 30B, controllable system module 82A, 82B, user input panel module 72A, and ESMC modules 80A-C.

In an embodiment, an EMC system 110D may communicate live or recorded images and audio from the cameras 16A, 16B and sensor modules 16D, 16F, 16J readings to user device 30A, and 30B, controllable system module 82A, 82B, display module 70A, and ESMC modules 80A-C when a sensor module 16D, 16F, 16J is outside preset ranges. The preset sensor ranges for sensor modules 16D, 16F, 16J may indicate potential environment hazard issues. A user 136 via a user device 30A, and 30B, controllable system module 82A, 82B, user input panel module 72A, and ESMC modules 80A-C may set preset sensor ranges for sensor modules 16D, 16F, 16J. In an embodiment, an EMC system 110D may activate lights, generate sound, contact other groups including emergency services via a controllable system module 82A, 82B when a sensor module 16D, 16F, 16J is outside preset ranges. In an embodiment, a controllable system module 82A, 82B may include an alarm system interface and a communications network interface including plain old telephone services (POTS).

FIG. 9C is a simplified block diagram of another main ESMC module 10E according to various embodiments. As shown in 9C, the main ESMC module 10E may include the base ESMC module 11A, a user input module 72B, a speaker 69, a display module 70A, a visible light camera module 16A, a light generation module 58A, an infrared sensor module 16B, and a pressure sensor module 16H. In an embodiment, the main ESMC module 10E may employed in a mammal or baby monitoring and control (MBMC) system 110E shown in FIGS. 9A and 9B. FIG. 9A is a front view of a simplified diagram of a MBMC system 110E according to various embodiments. FIG. 9B is a back view of a simplified diagram of a MBMC system 110E according to various embodiments. As shown in FIG. 9A, the MBMC system 110E front face 17A may include a visible light camera module 16A, an infrared camera module 16B, a pressure sensor module 16H, and speaker grill 17E on its front face 17A. As shown in FIG. 9B, the MBMC system 110E back panel 17C may include a user input panel module 72A, a display module 70A, and a light generation module passage ports 58B.

Figure 6C:
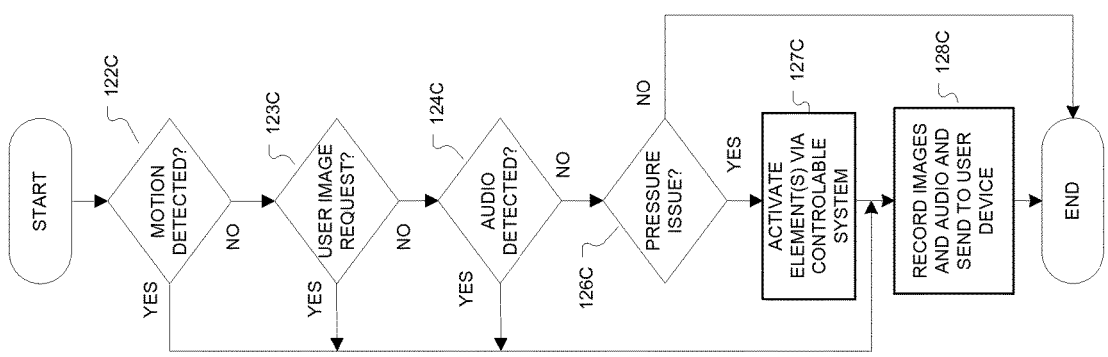

In an embodiment, the MBMC system 110E may employ the algorithm 120C shown in FIG. 6C. In an embodiment, the MBMC system 110E may communicate live or recorded images and audio from the cameras 16A, 16B and pressure data from sensor module 16H to user device 30A, and 30B, controllable system module 82A, 82B, display module 70A, and ESMC modules 80A-C when requested by a user (activities 123C and 128C). A user may request the images, audio, or data via user device 30A, and 30B, controllable system module 82A, 82B, user input panel module 72A, and ESMC modules 80A-C. The MBMC system 110E may also communicate live or recorded images and audio from the cameras 16A, 16B and pressure data from sensor module 16H to a user device 30A, and 30B, controllable system module 82A, 82B, display module 70A, and ESMC modules 80A-C when motion is detected by cameras 16A, 16B ((activities 122C and 128C), noise is detected by the camera 16A (microphone) (activities 124C and 128C), or a change in pressure patterns (breathing issues) (activities 126C and 128C) is detected. The MBMC system 110E may evaluate pressure data received from the pressure sensor 16H to detect breathing issues in an embodiment. In an embodiment, a MBMC system 110E may also activate lights, sounds, contact emergency services, and other elements via a controllable system module 82A, 82B (activity 127C) when a pressure issue is detected (activity 126C). In an embodiment, a user may set alarms for breathing rates below or above a detected rate the MBMC system 110E via a user device 30A, and 30B, controllable system module 82A, 82B, user input panel module 72A, and ESMC modules 80A-C.

FIGS. 10A, 10B are simplified diagrams of a lighting and sound monitoring and control (LSMC) system 110F in an embodiment. FIG. 10A is a front view of a simplified diagram of the LSMC system 110F according to various embodiments. FIG. 10B is a back view of a simplified diagram of a security system 110C according to various embodiments. As shown in FIG. 10A, the LSMC system 110F front face 17A may include a visible light camera module 16A, an infrared camera module 16B and a speaker grill 17E. As shown in FIG. 10A, the LSMC system 110F rear face 17C may include a user input panel module 72A, a display module 70A, and a light generation module passage ports 58B.

In an embodiment, the LSMC system 110F may employ the algorithm 120D shown in FIG. 6D. In an embodiment, the LSMC system 110F may communicate live or recorded images and audio from the cameras 16A, 16B to a user device 30A, and 30B, controllable system module 82A, 82B, display module 70A, and ESMC modules 80A-C when requested by a user. A user may request the images, audio, or data via user device 30A, and 30B, controllable system module 82A, 82B, user input panel module 72A, and ESMC modules 80A-C. In an embodiment, a LSMC system 110F activate lights or a light group via a controllable system module 82A, 82B (activity 123D). A user may request the light activations via user device 30A, and 30B, user input panel module 72A, and ESMC modules 80A-C (activity 122D).

A LSMC system 110F may play sounds or a group of sounds (including a playlist) via a controllable system module 82A, 82B (activities 126D, 128D). A user may request the generation of sound or sound groups via user device 30A, and 30B, user input panel module 72A, and ESMC modules 80A-C (activity 124D). In an embodiment, the LSMC system 110F may request, download, or retrieve a sound or sound playlist from a user device 30A, 30B (activity 126D). The LSMC system 110F may transmit sounds to played or a playlist to a controllable system module 82A, 82B and direct the module 82A, 82B to play the sounds or playlist of sounds (or songs) in an embodiment (activity 128D).

FIG. 12 is a block diagram of ESMC communication processing architecture 130 providing a sensor data and controllable action web page according to various embodiments. As shown in FIG. 12, architecture 130 depicts a media processing module 140A may providing a HTML file 175 representing an encoded web page 154 to a user device 30A via a HUB 200. The user device 30A may include an application 173 that may encode and decode Hyper-Text Markup Language (HTML) files in the user device 30A system 172. In an embodiment, the application 173 may include a web browser. As shown in FIG. 3A, a base ESMC module 11A may include a media process module 140A in an embodiment. As shown in FIG. 12, the media processing module 140A may include a webserver 142, a media parser 144, a multimedia server 146, a media database 148, and a server table database 149.

In an embodiment, media database 148 may store image and audio data to be communicated to a user device 30A or received from a user device 30A. The image and audio data may be protected by digital right management (DRM) protection. The image and audio data may be broadcast by or received from a main ESMC module 10A-10F, ESMC module 80A-C, controllable system module 82A, 82B, and user devices 30A, 30B in an embodiment. The media parser 144 may process image and audio in different digital formats. The multimedia server 146 may encode parsed media into HTML files to be communicated by the webserver 142 in an embodiment. The multimedia server 146 may decode media received in HTML files by the webserver 142. The media parser 144 may format the decoded media for storage in the media database 148 in an embodiment.

The server table database 149 may include various configuration, setting, and media listings for the main ESMC module 10A-10F, ESMC module 80A-C, controllable system module 82A, 82B, and user devices 30A, 30B that may be employed in a system 110A-110F. The multimedia server 146 may encode and decode server table database 149 data into HTML files to be communicated by the webserver 142 in an embodiment. As shown in FIG. 12, the sensor data and controllable action web page 154 on a user device 30A may include sensor data 153A and selection 157A and properties entry 155A for the sensor data 153A. The sensor data 153A may relate to sensor modules 130A shown in FIG. 3B. The web page 154 may also include actions 153B and selection 157B and properties entry 155B for the actions 153B. The actions 153B may include actions that may be performed by a controllable system module 82A, 82B, main ESMC modules 10A-10F, and ESMC modules 80A-C. The web page 154 may also include an external media upload or download link 16I and selection 163 and properties entry 165 for the external media upload or download link 16I. The external media may be media communicated between a controllable system module 82A, 82B, main ESMC modules 10A-10F, ESMC modules 80A-C, or user devices 30A, 30B.

Figures 11A, 11B:
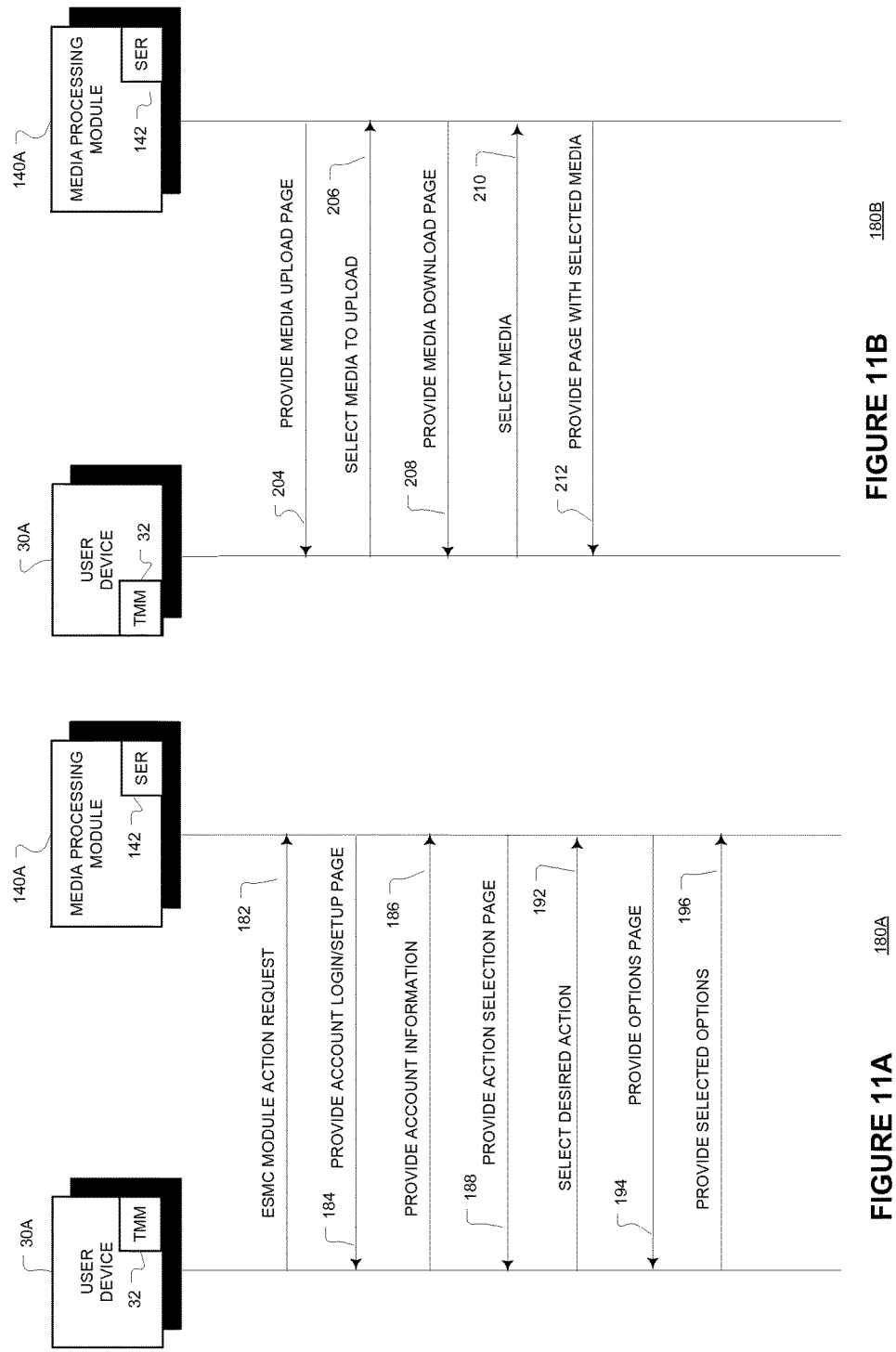
FIGS. 11A-B are diagrams of communication flow between a user device and media processing module of an ESMC system according to various embodiments.

FIGS. 11A-B are diagrams of communication flow 180A, 180B between a user device 30A and a media processing module 140A of an ESMC system 10A-10F according to various embodiments. FIG. 11A may represent communications 180A between a user device 30A and a media processing module 140A when a user device 30A initially links with a media processing module 140A during a session in an embodiment. A user 136 via a user device 30A may request an action of a controllable system module 82A, 82B, main ESMC modules 10A-10F, or ESMC modules 80A-C (communication 182). In an embodiment, a main ESMC module 10A-10F may include security protocols. The ESMC module 10A-10F may require a user 136 via a user device to provide user credentials prior to requesting an action. An ESMC module 10A-10F may provide an account login/setup page (communication 184). A user via a user device 30A may provide account details or information (communication 186).

When the account information is validated, an ESMC module 10A-10F may provide an action selection page (communication 188) to a user device 30A such as page 154 shown in FIG. 12. A user 136 via the action selection page may select one or more actions (communication 192) to be performed by a controllable system module 82A, 82B, main ESMC modules 10A-10F, or ESMC modules 80A-C. In an embodiment, an ESMC module 10A-10F may provide an option selection page (communication 194) to a user device 30A. A user 136 via the option selection page may select one or more options (communication 194) associated with actions to be performed by a controllable system module 82A, 82B, main ESMC modules 10A-10F, or ESMC modules 80A-C.

FIG. 11B may represent communications 180B between a user device 30A and a media processing module 140A to upload and download media between a user device 30A and a main ESMC module 10A-10F. An ESMC module 10A-10F may provide a media upload page (communication 204). A user via a user device 30A may select media to be uploaded (communication 206). The uploaded media may be stored or broadcast by a controllable system module 82A, 82B, main ESMC modules 10A-10F, or ESMC modules 80A-C in an embodiment. An ESMC module 10A-10F may provide a media download page (communication 208) to enable a user to download media to a user device 30A. A user via a user device 30A may select media to be downloaded (communication 210). The media to be downloaded may be stored or communicated by a controllable system module 82A, 82B, main ESMC modules 10A-10F, or ESMC modules 80A-C in an embodiment. In an embodiment, a main ESMC module 10A-10F may provide a web page with the selected media (communication 212). A user 136 via a user device 30A may download the media via the web page.

The modules may include hardware circuitry, single or multi-processor circuits, memory circuits, software program modules and objects, firmware, and combinations thereof, as desired by the architect of the architecture 100A, 100B, and 10A-10F and as appropriate for particular implementations of various embodiments. The apparatus and systems of various embodiments may be useful in applications. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A modular sensor apparatus, the apparatus including:
a first wireless communication module the first wireless communication module including a transceiver employing a first protocol to receive digital data from an electronic sensor and controlling the operation of the electronic sensor, at least a portion of the digital data being associated with an exterior of a residential environment;
an internal memory capable of storing the digital data received from the electronic sensor;
a second wireless communication module, the second wireless communication module including a transceiver employing a second protocol different from the first protocol to communicate real time electronic sensor data and at least some of the digital data stored in the internal memory with a portable user device, the portable user device including an internal electrical energy storage element, a processor, and a user perceptible display; and
an interface configured to control an operation of an environmental condition modifying device by at least generating, based at least on the digital data from the electronic sensor, a command triggering an activation of one or more lights by the environmental condition modifying device, the one or more lights being activated to at least illuminate an interior of the residential environment.

2. The modular sensor apparatus of claim 1, further including a processor, the processor controlling the operation of the first and the second wireless communication module, communicating data between the internal memory and the first and the second wireless communication module.

3. The modular sensor apparatus of claim 1, further including a processor including the internal memory, the processor controlling the operation of the first and the second wireless communication module, communicating data between its internal memory and the first and the second wireless communication module.

4. The modular sensor apparatus of claim 2, the processor including a web server to generate a web page to the portable electronic device, the web page including real time electronic sensor data and electronic sensor data stored in the internal memory and the portable electronic device including a web browser enabling a user to view the web page.

5. The modular sensor apparatus of claim 4, the webserver capable of decoding a web based request received from a user portable electronic device and controlling the operation of the electronic sensor based on the decoded web based request.

6. The modular sensor apparatus of claim 4, further including an electrical energy storage module and the webserver generating a web page to the portable electronic device including the electrical energy storage module energy level.

7. The modular sensor apparatus of claim 1, further including an electronic sensor coupled to the processor via a wired connection.

8. The modular sensor apparatus of claim 1, wherein the environmental condition modifying device includes a light generation module.

9. The modular sensor apparatus of claim 1, wherein the environmental condition modifying device includes a heating, ventilation, and/or air conditioning device.

10. The modular sensor apparatus of claim 1, the processor including a web server to generate a web page for the portable electronic device, the web page including real time status of the environmental condition modifying device and the portable electronic device including a web browser enabling a user to view the web page.

11. The modular sensor apparatus of claim 1, the processor including a web server to generate a web page for the portable electronic device, the web page including control options for the environmental condition modifying device and the portable electronic device including a web browser enabling a user to view the web page.

12. The modular sensor apparatus of claim 11, the webserver capable of decoding a web based request to modify a control option for an environmental condition modifying device received from a user portable electronic device and modifying a control option for an environmental condition modifying device based on the decoded web based request.

13. The modular sensor apparatus of claim 1, wherein the electronic sensor includes one of a humidity sensor, a chemical sensor, an infrared sensor, a temperature sensor, a pressure sensor, a carbon monoxide sensor, a carbon dioxide sensor, and/or an electrical energy sensor.

14. The modular sensor apparatus of claim 1, wherein the electronic sensor includes one of an audio sensor and/or an imaging sensor.

15. The modular sensor apparatus of claim 13, wherein the first wireless communication module receives electronic data from another electronic sensor.

16. The modular sensor apparatus of claim 13, wherein the another electronic sensor includes one of an audio sensor and imaging sensor.

17. The modular sensor apparatus of claim 13, wherein the first wireless communication module receives digital data from another electronic sensor.

18. The modular sensor apparatus of claim 7, wherein the wired electronic sensor includes one of a humidity sensor, chemical sensor, infrared sensor, temperature sensor, pressure sensor, CO sensor, CO2 sensor, and electrical energy sensor.

19. The modular sensor apparatus of claim 7, wherein the apparatus electrical energy storage module includes a user interchangeable battery.

20. The modular sensor apparatus of claim 1, wherein the interface is further configured to control the operation of the environmental condition modifying device by at least generating, based at least on the digital data from the electronic sensor, another command triggering a generation of one or more sounds by the environmental condition modifying device.

* * * * *